(12) United States Patent
Lee et al.

(10) Patent No.: US 8,110,936 B2
(45) Date of Patent: Feb. 7, 2012

(54) POWER TRANSMISSION APPARATUS FOR WIND POWER GENERATION AND WIND POWER GENERATOR USING THE SAME

(75) Inventors: Yong Heun Lee, Gyeonggi-do (KR); Kwan Jae Lee, Seoul (KR)

(73) Assignee: Hankuk Relay Co., Ltd. (KR)

( * ) Notice: Subject to any disclaimer, the term of this patent is extended or adjusted under 35 U.S.C. 154(b) by 525 days.

(21) Appl. No.: 12/347,385

(22) Filed: Dec. 31, 2008

(65) Prior Publication Data

US 2010/0026006 A1    Feb. 4, 2010

(30) Foreign Application Priority Data

Jul. 30, 2008  (KR) .................. 10-2008-0074329
Sep. 16, 2008  (KR) .................. 10-2008-0090715

(51) Int. Cl.
*F03D 9/00* (2006.01)

(52) U.S. Cl. ............... 290/44; 290/55; 310/103; 464/29

(58) Field of Classification Search ............ 310/92, 310/103, 104, 106; 417/420; 464/29; 415/4.2, 415/4.3, 4.5; 416/111, 117, 119; 290/43, 290/44, 54, 55

See application file for complete search history.

(56) References Cited

U.S. PATENT DOCUMENTS

| | | | |
|---|---|---|---|
| 5,470,208 A * | 11/1995 | Kletschka | 417/356 |
| 7,042,109 B2 * | 5/2006 | Gabrys | 290/44 |
| 7,112,904 B2 * | 9/2006 | Akiyama | 310/103 |
| 7,438,120 B2 * | 10/2008 | Hong et al. | 165/80.4 |
| 7,582,997 B2 * | 9/2009 | Rojo Lulic | 310/103 |
| 2002/0102169 A1 * | 8/2002 | Wampler | 417/420 |
| 2006/0210412 A1 * | 9/2006 | Lawyer et al. | 417/420 |
| 2007/0041823 A1 * | 2/2007 | Miller | 415/4.1 |

* cited by examiner

*Primary Examiner* — Quyen Leung
*Assistant Examiner* — Naishadh Desai
(74) *Attorney, Agent, or Firm* — Cantor Colburn LLP

(57) ABSTRACT

The present invention provides a power transmission apparatus for wind power generation and a wind power generator using the same. The power transmission apparatus includes a first magnetic member which is provided around a rotating shaft of an impeller, and a second magnetic member which is provided around a rotor shaft of a generating unit. The second magnetic member is disposed at a position facing the first magnetic member such that similar poles of the first and second magnetic members face each other. Thus, when the impeller is rotated by wind, the rotor shaft of the generating unit is rotated by magnetic repulsive force between the first magnetic member and the second magnetic member. Thereby, the rotating force of the impeller is transmitted to the generating unit.

5 Claims, 26 Drawing Sheets

[Figure 1]
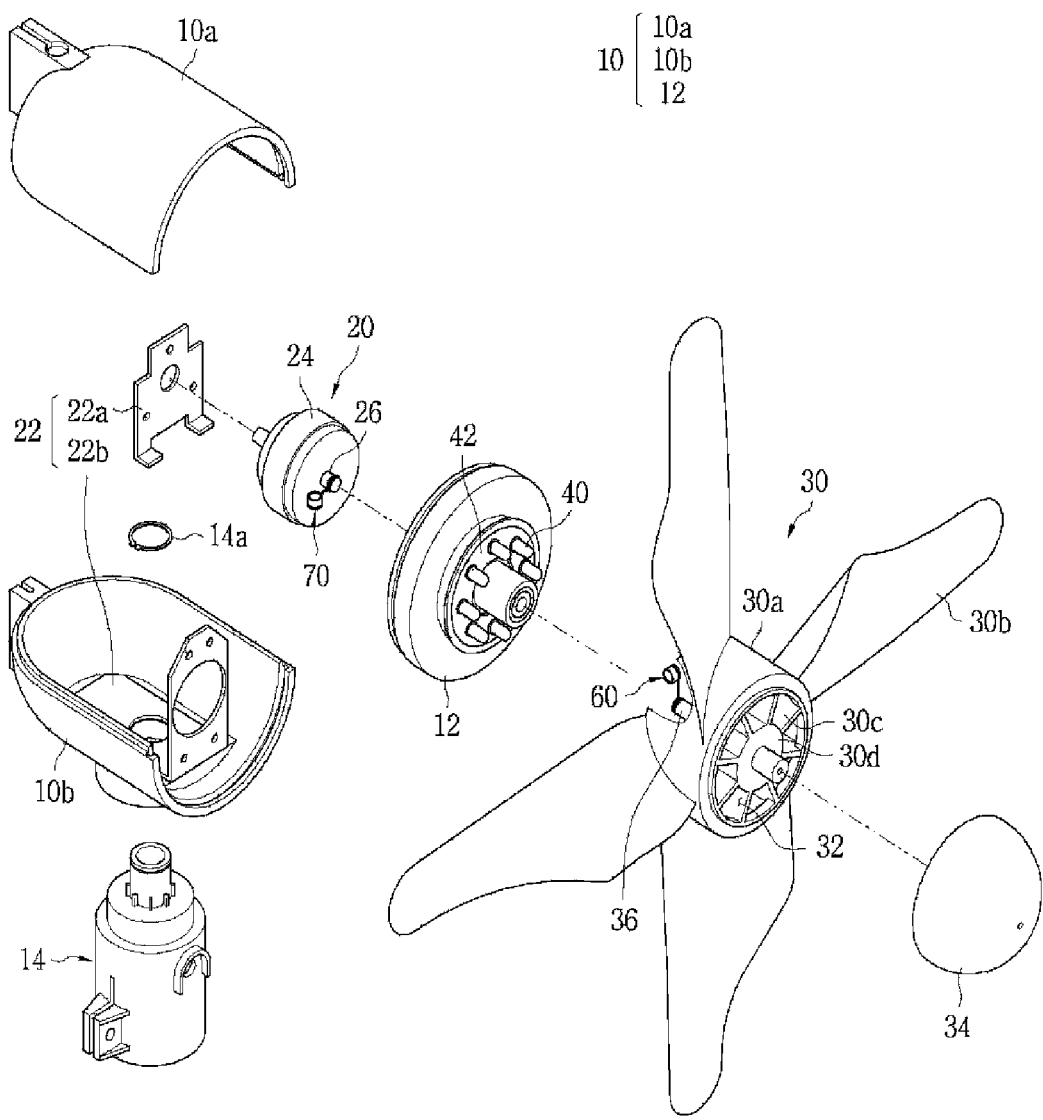

[Figure 2]
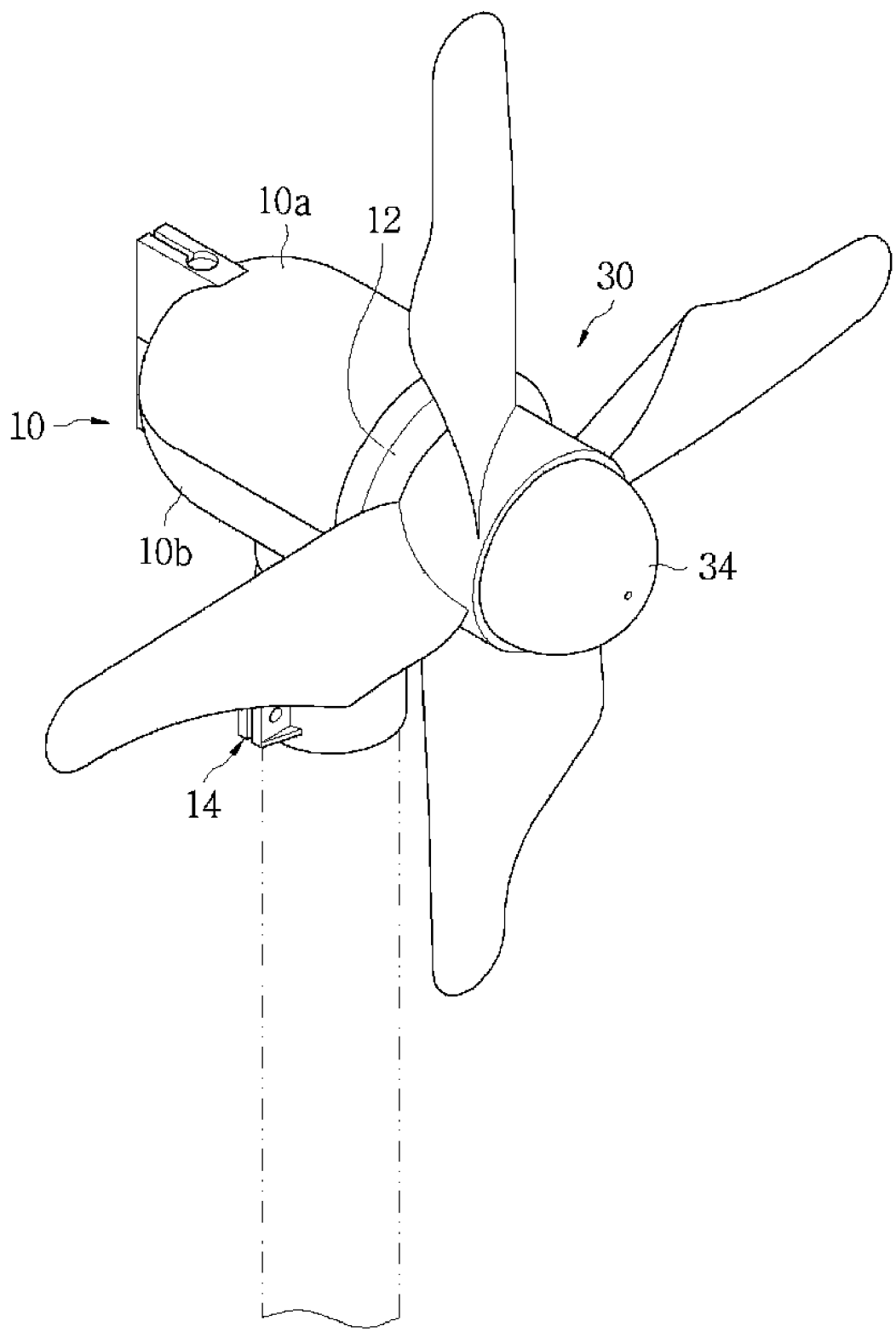

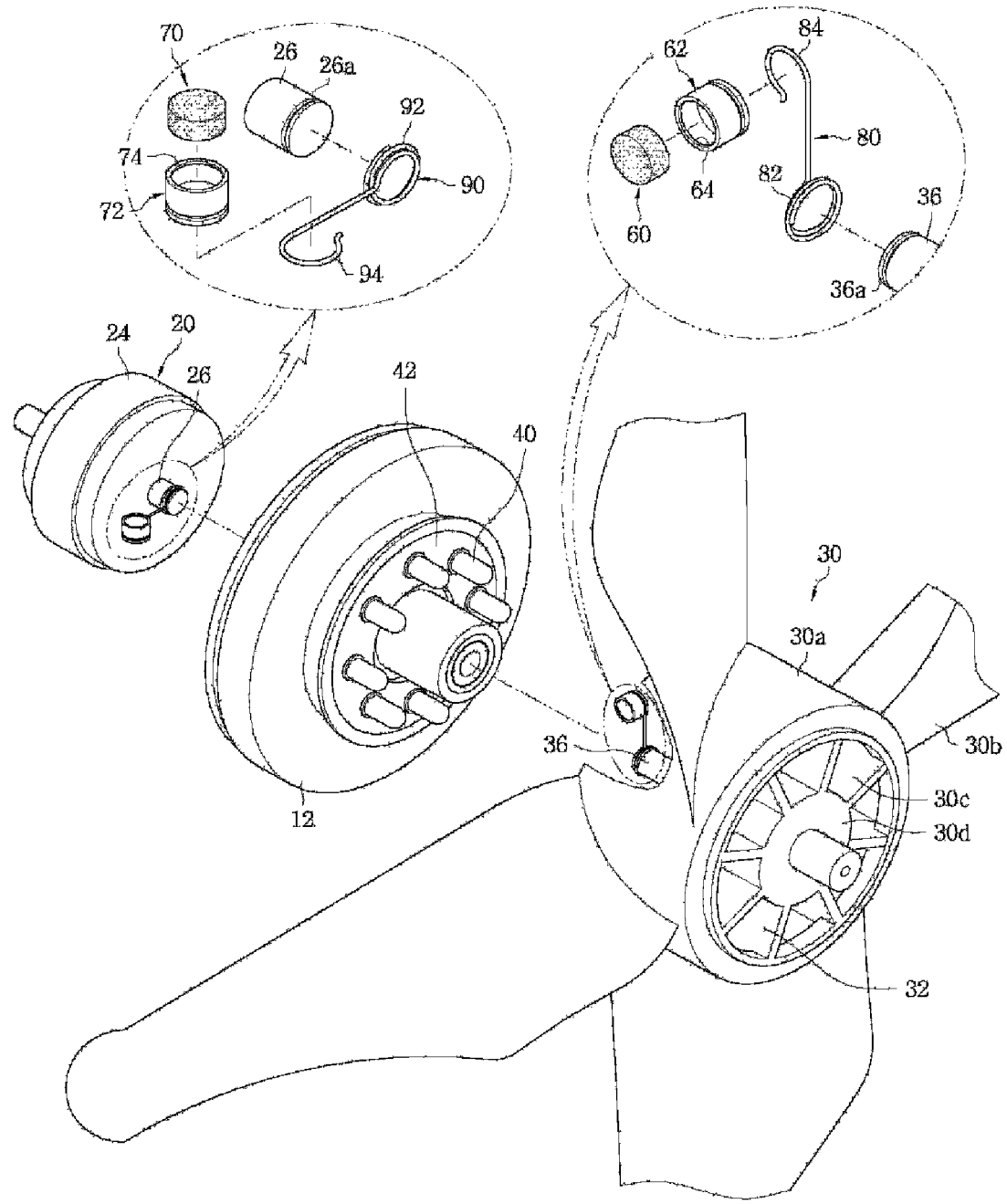
[Figure 3]

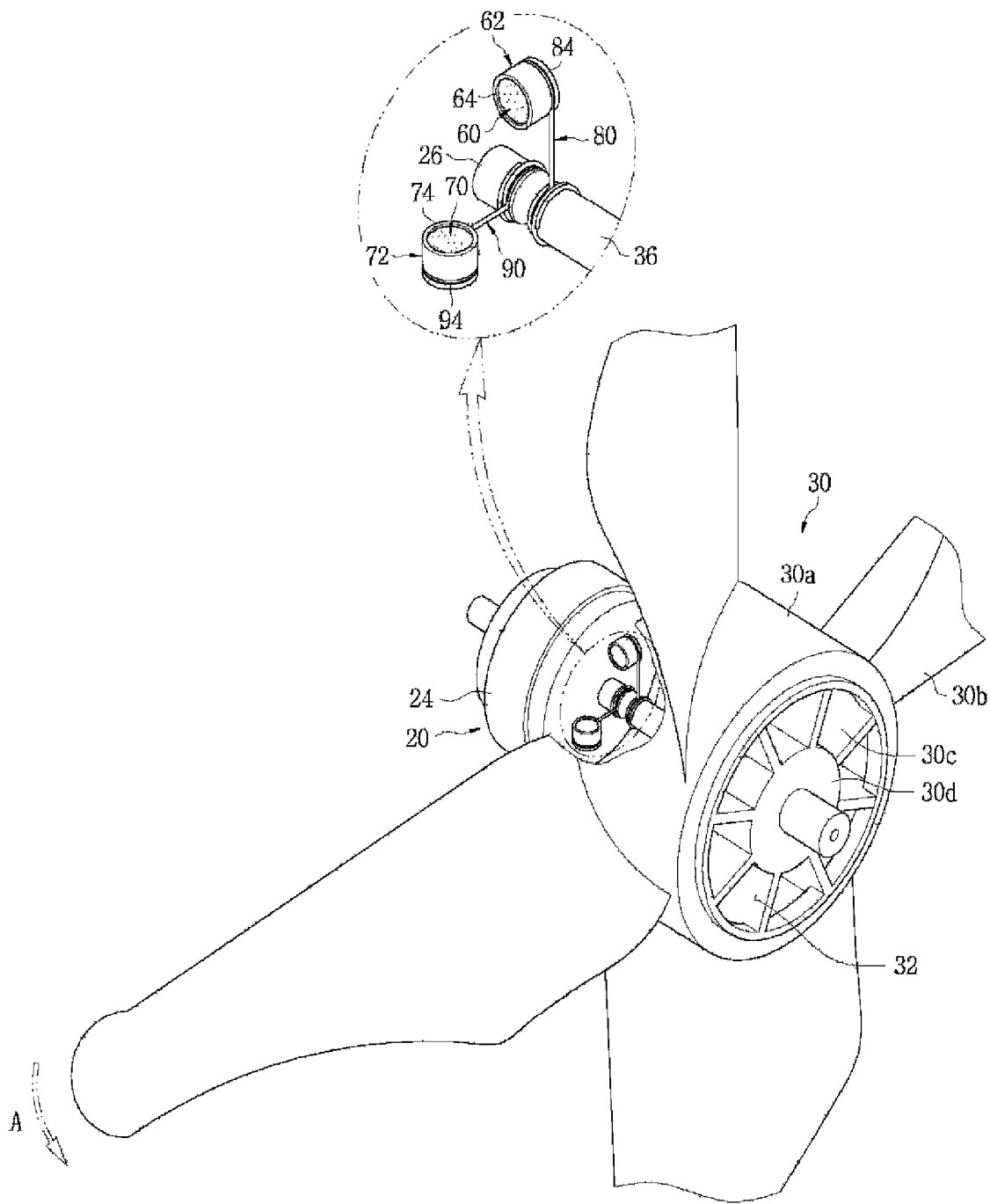
[Figure 4]

[Figure 5]
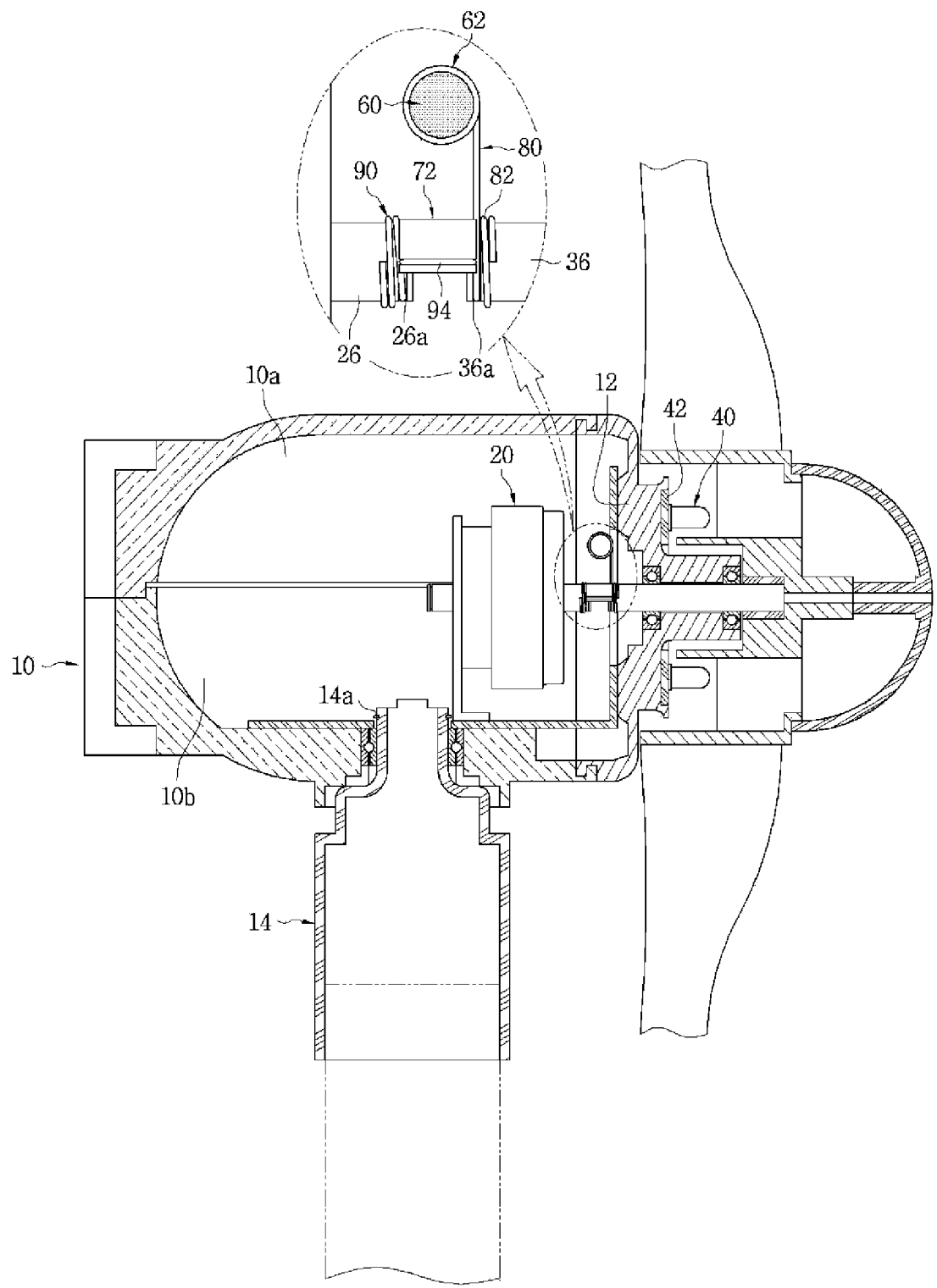

[Figure 6]
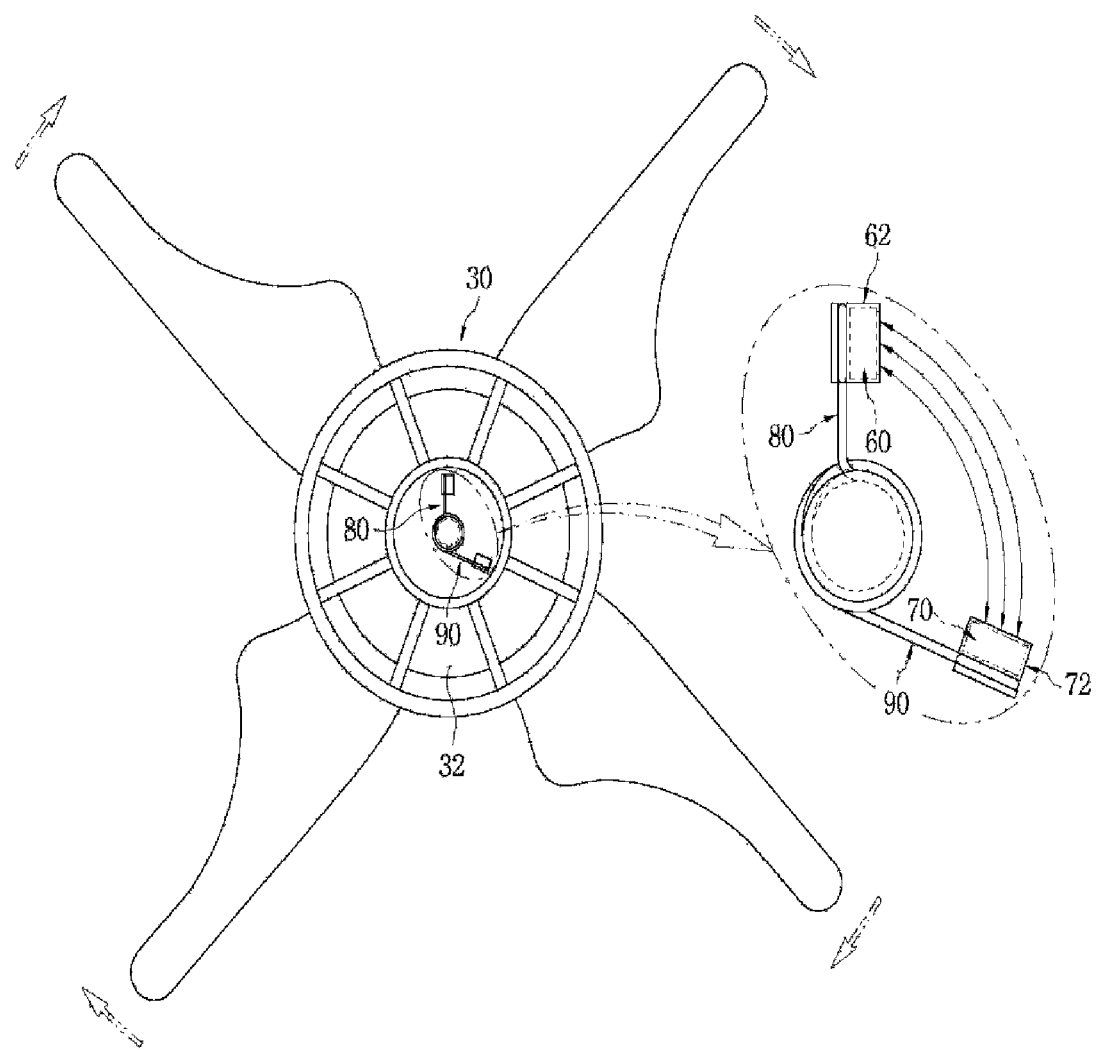

[Figure 7]
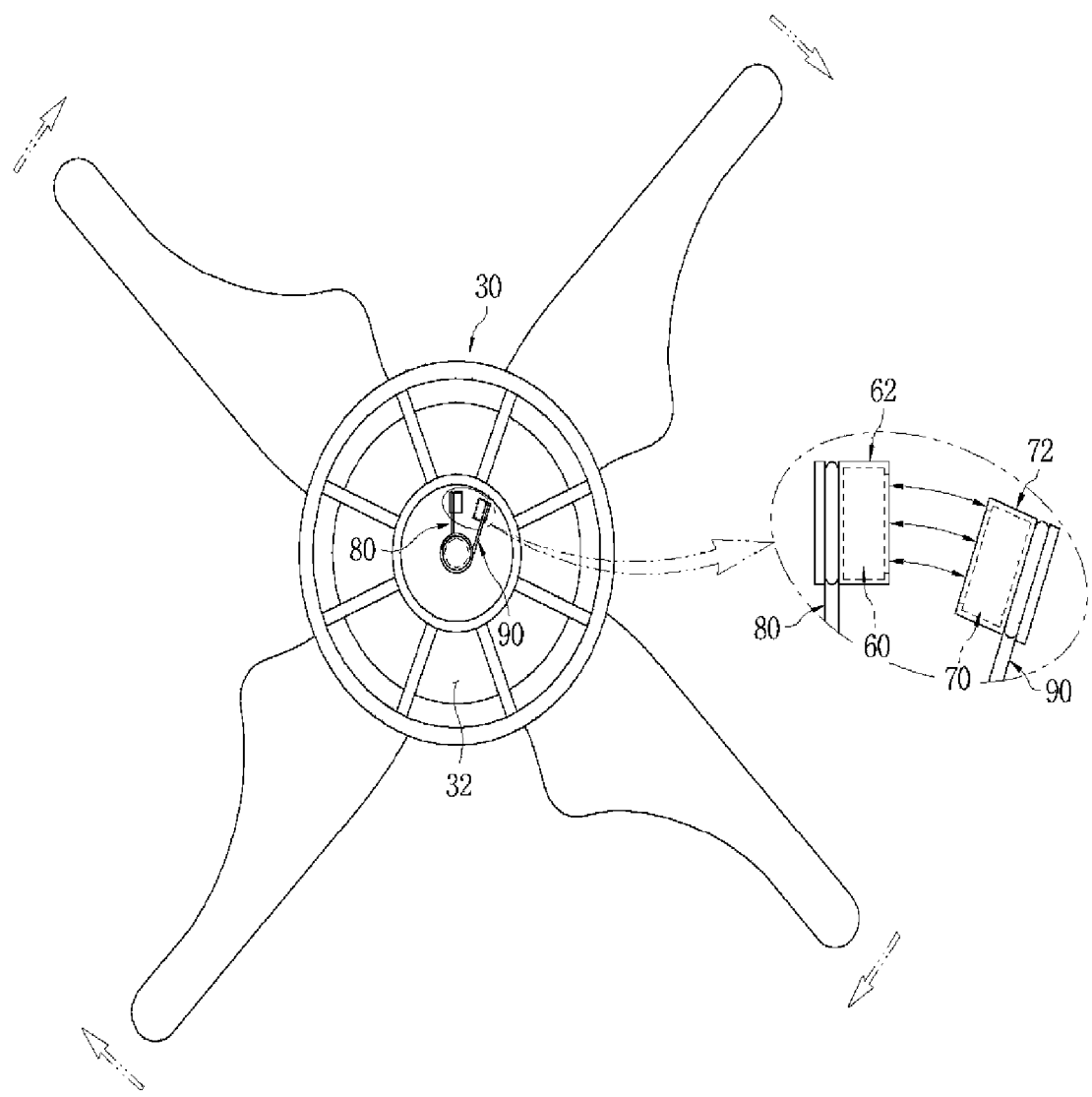

[Figure 8]
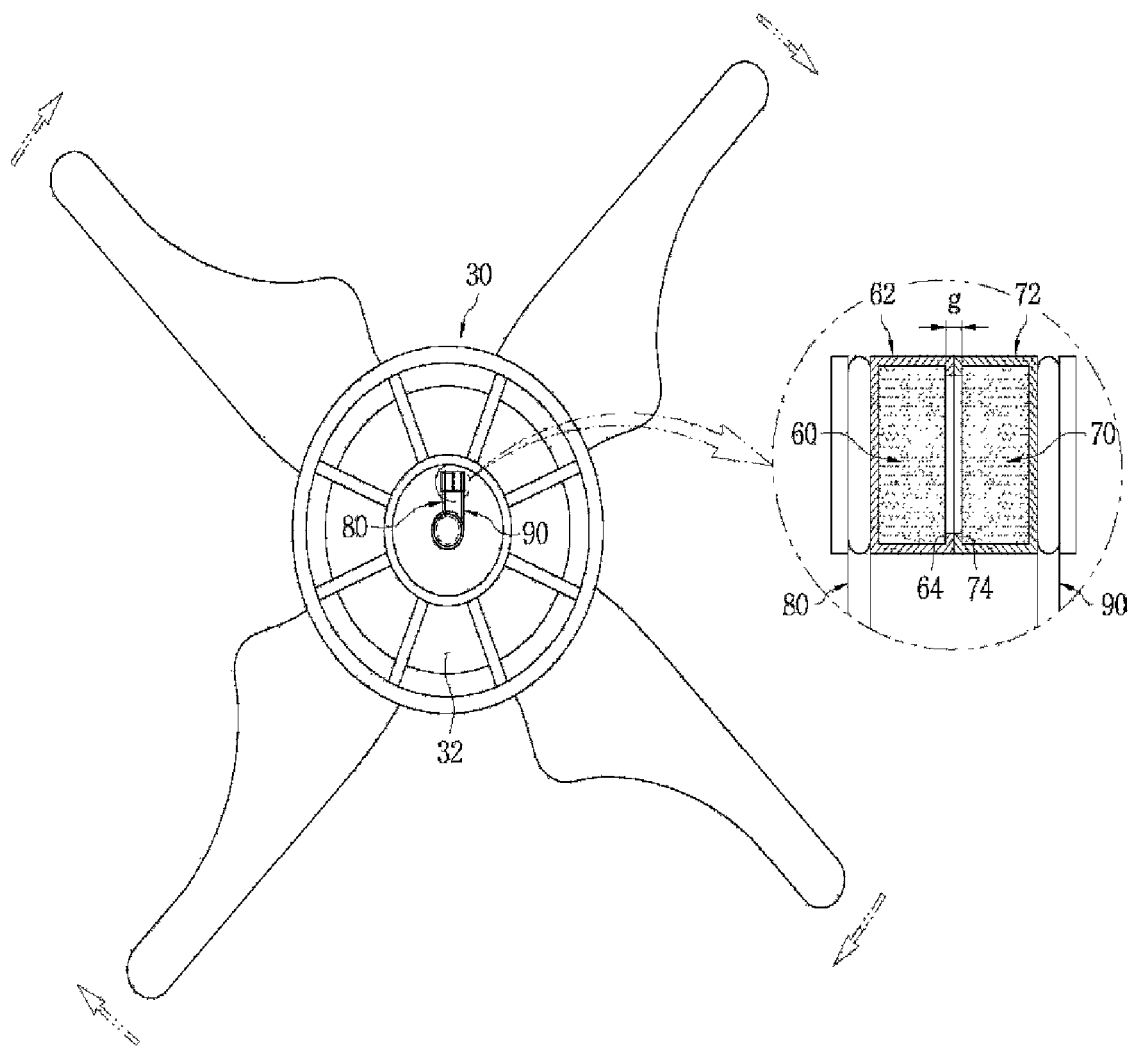

[Figure 9]
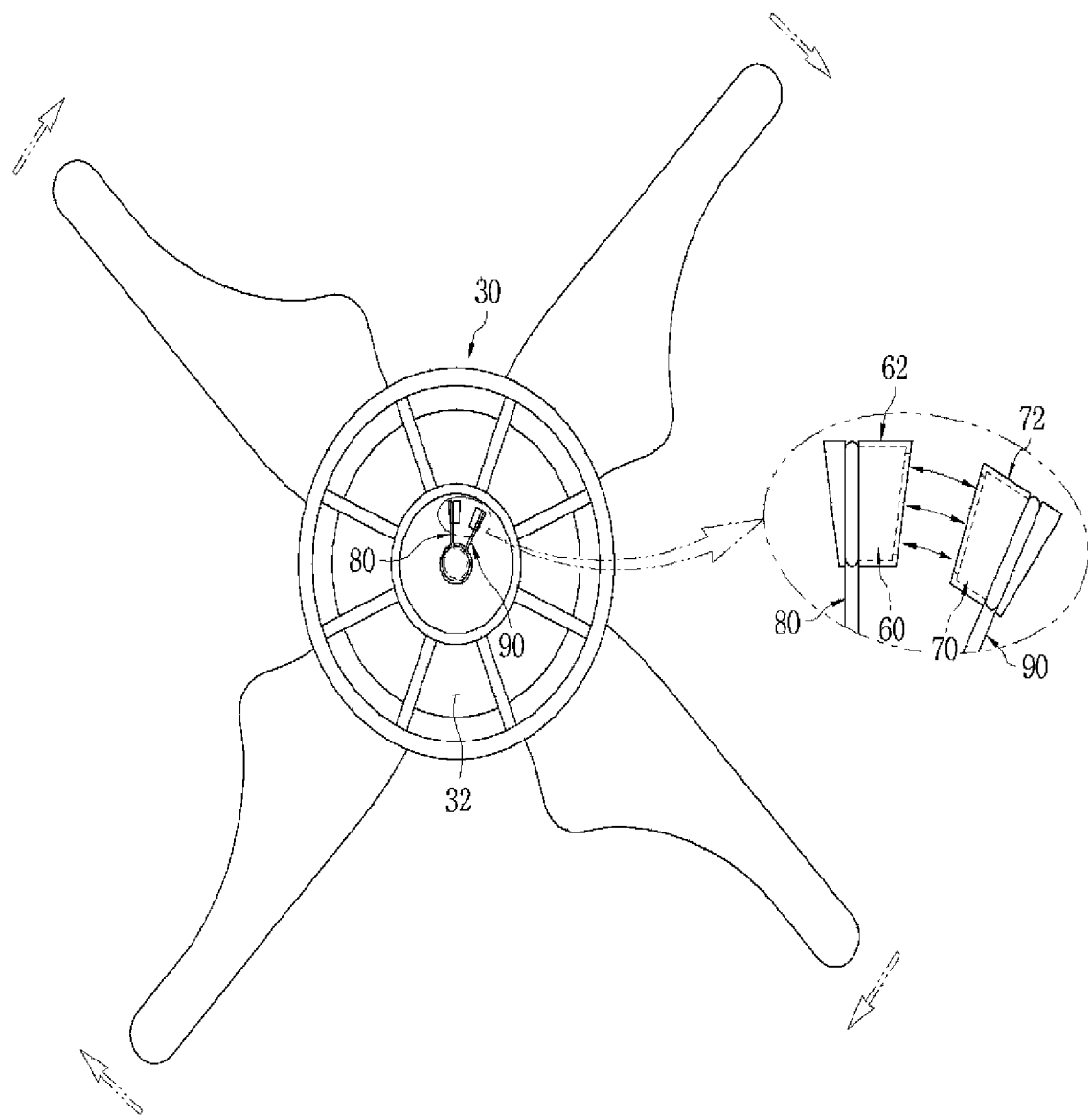

[Figure 10]
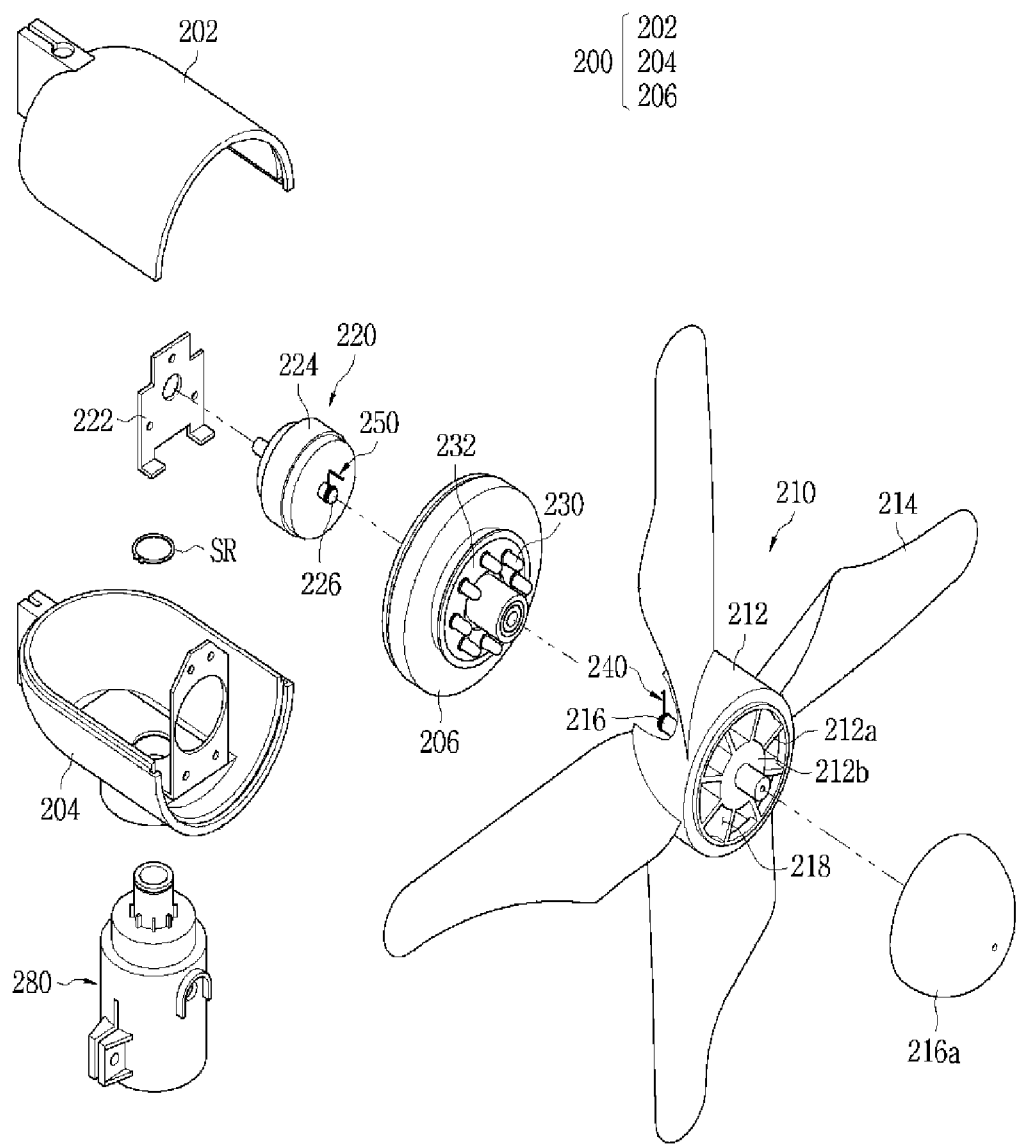

[Figure 11]
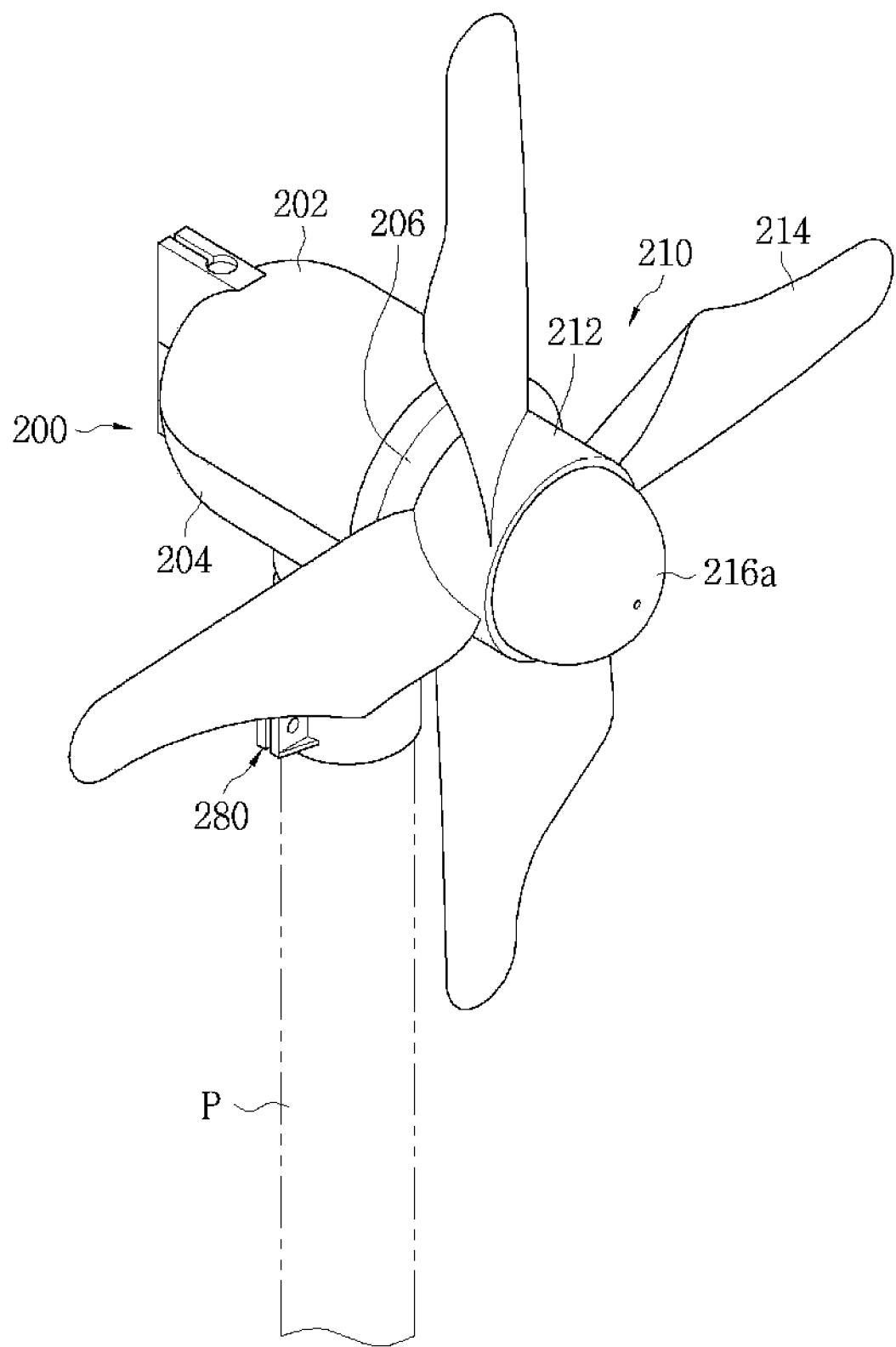

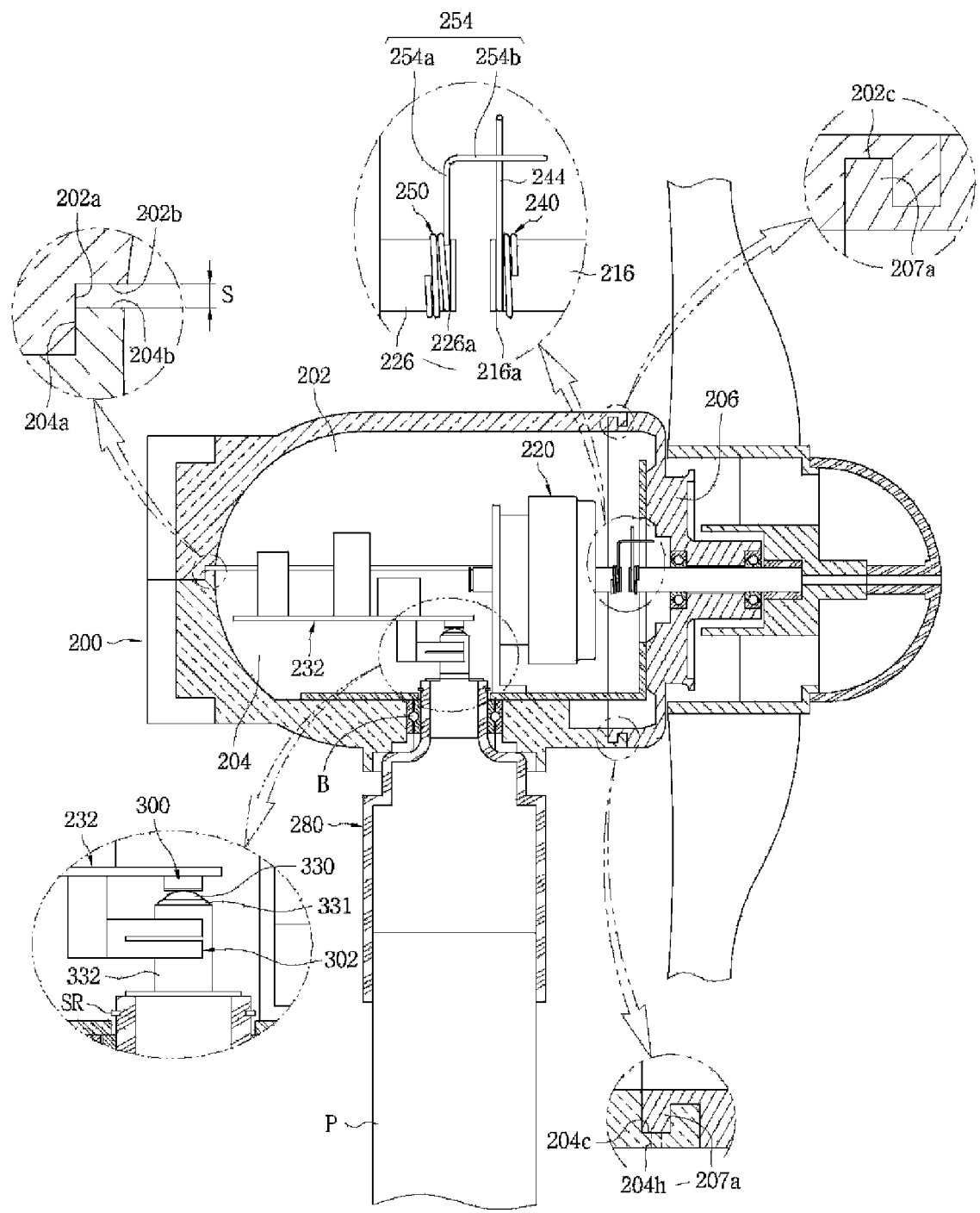
[Figure 12]

[Figure 13]
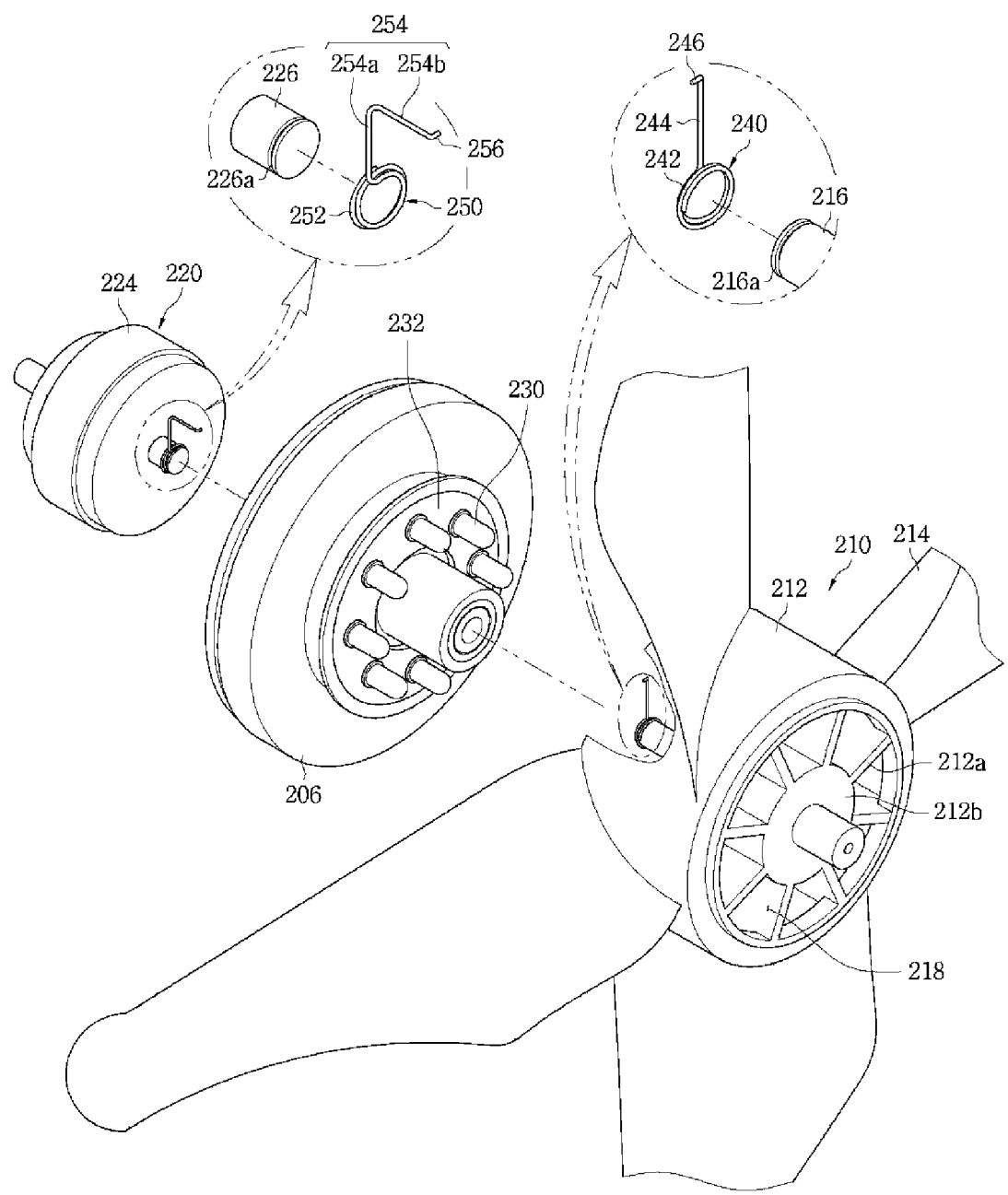

[Figure 14]
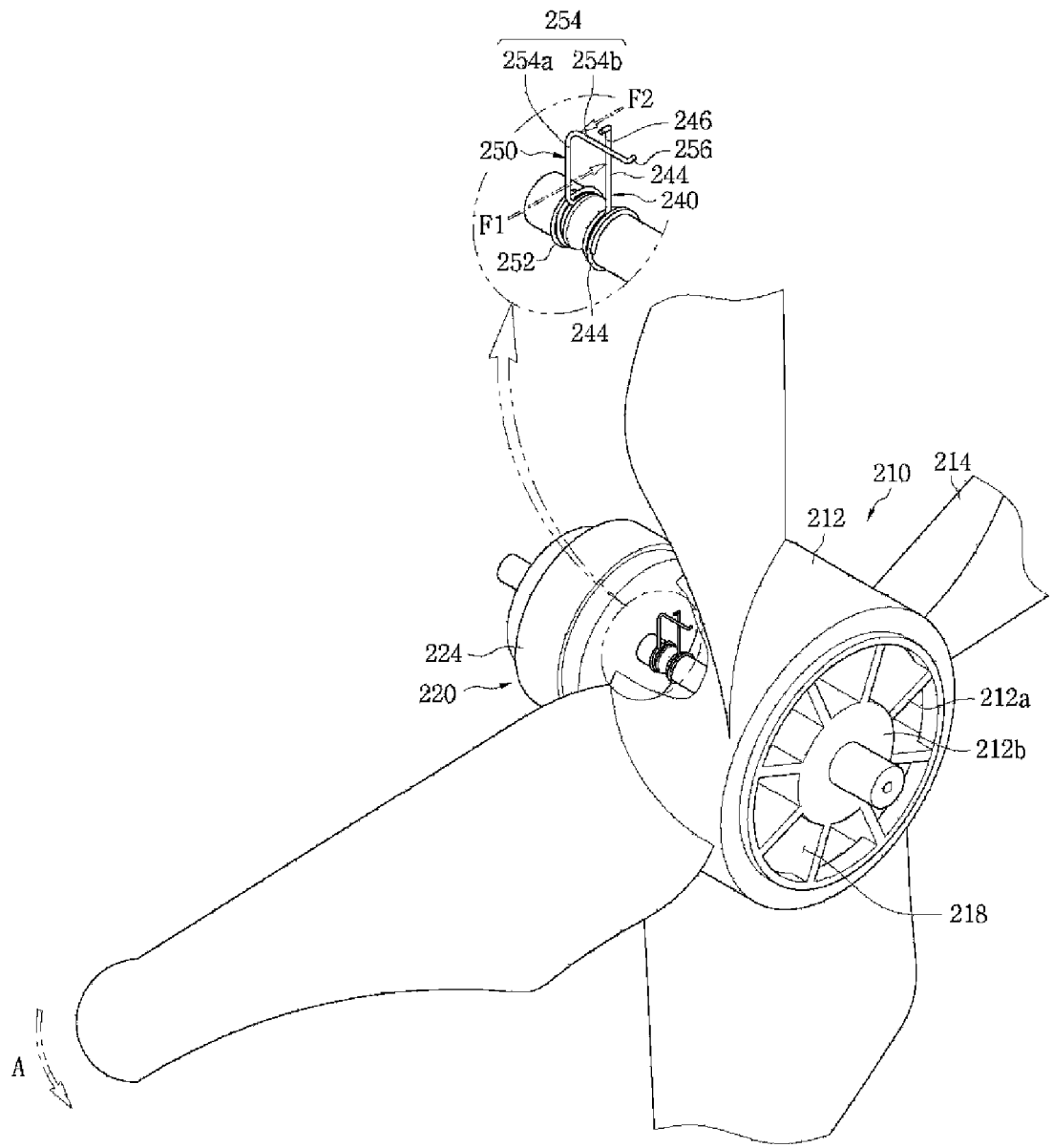

[Figure 15]
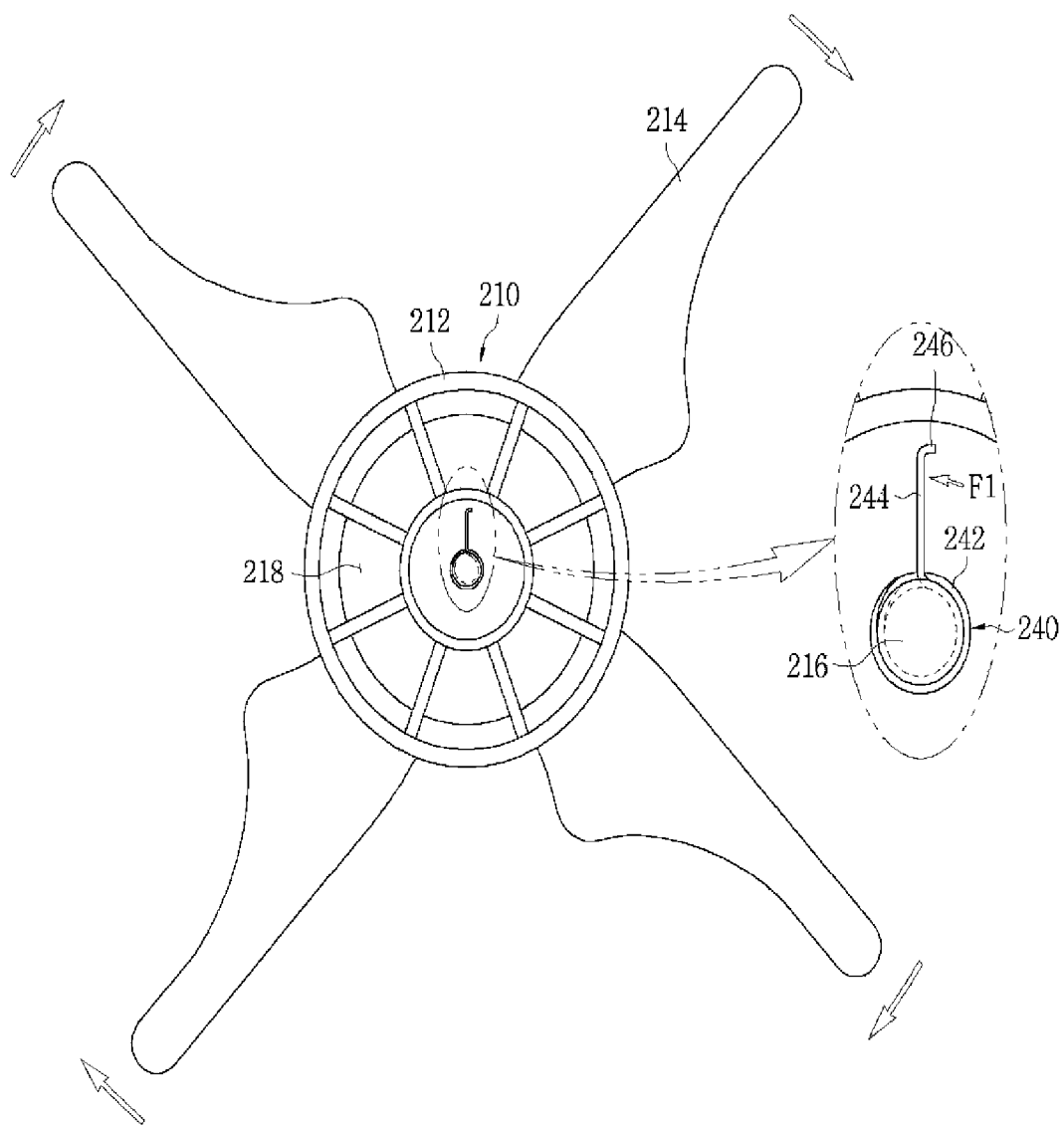

[Figure 16]
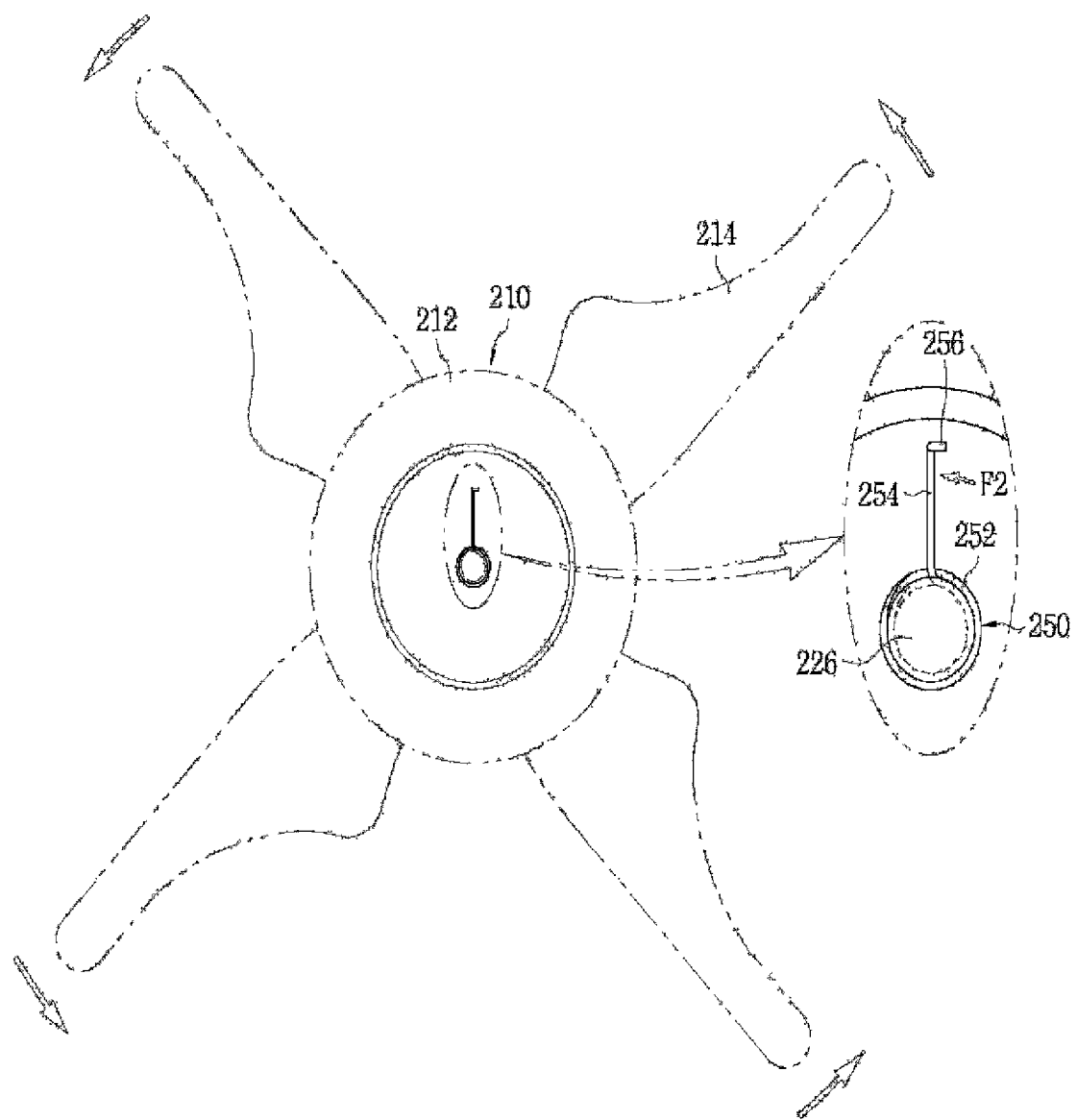

[Figure 17]
(a)
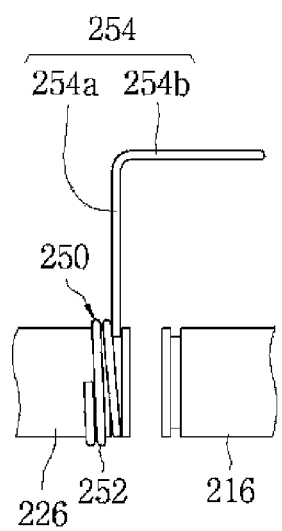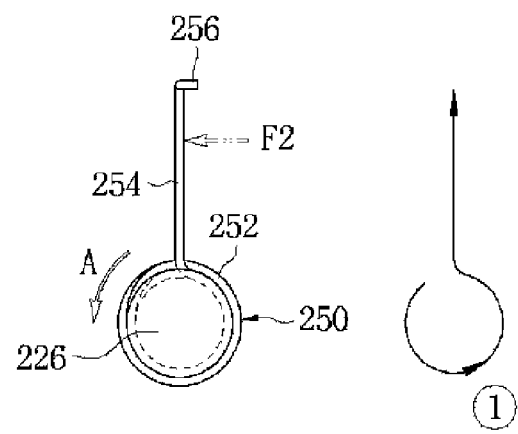
(b)
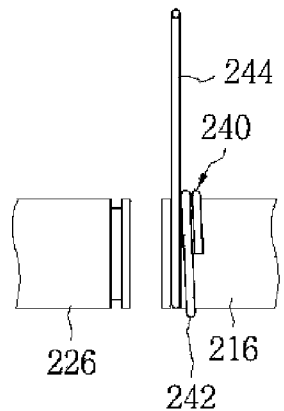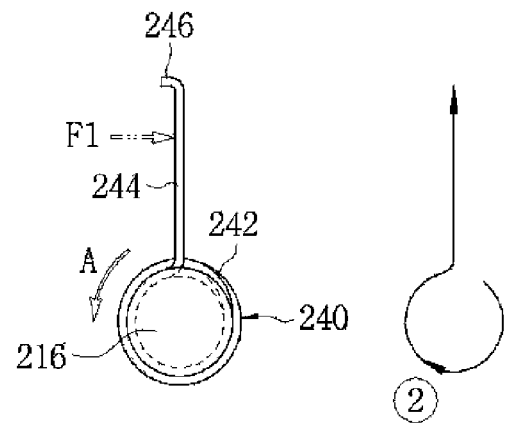

[Figure 18]
(a)
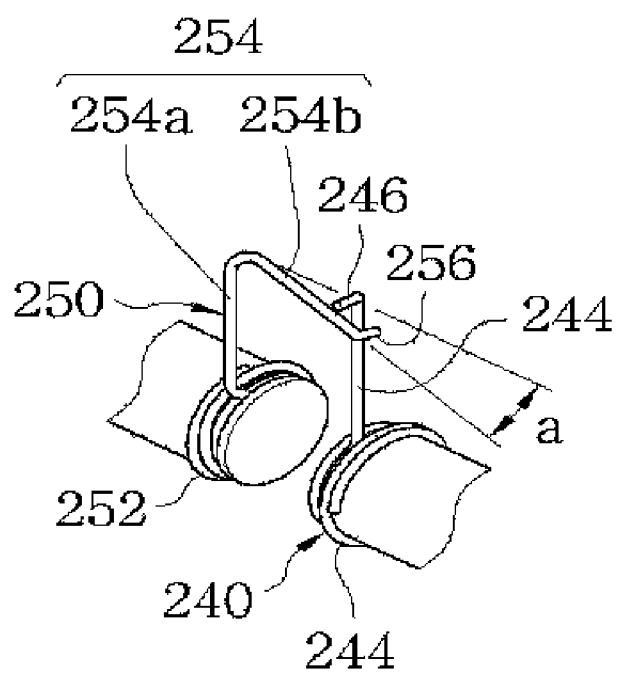
(b)
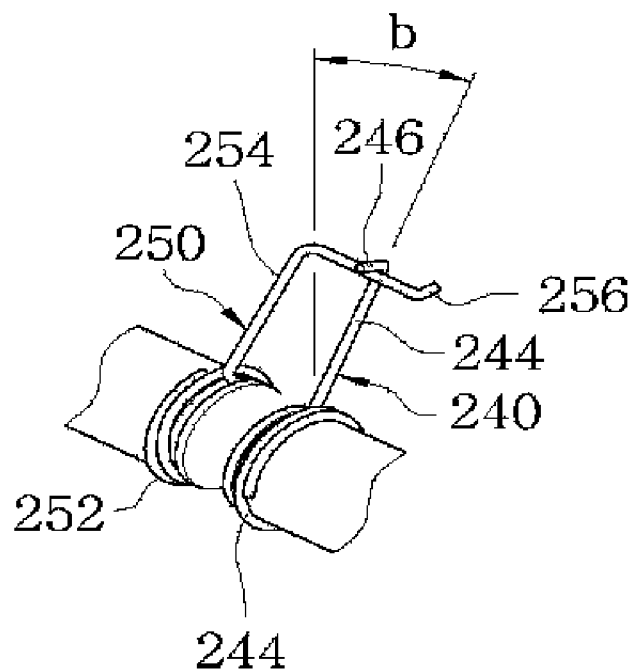

【Figure 19】
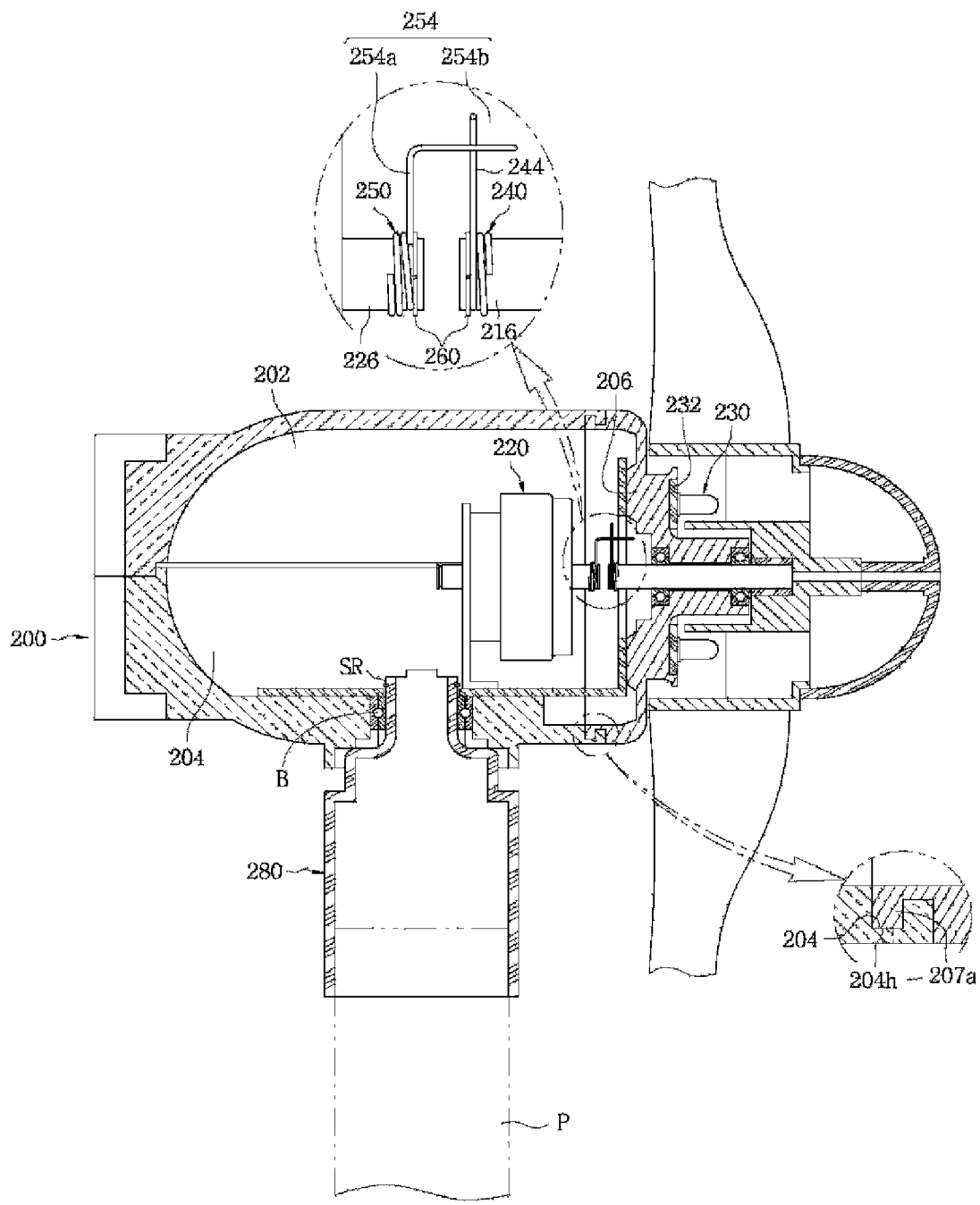

[Figure 20]
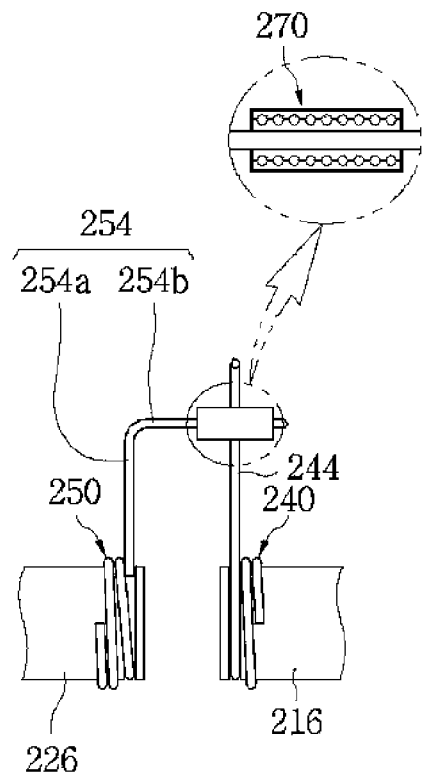
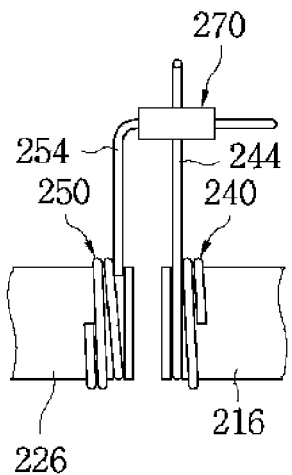

[Figure 21]
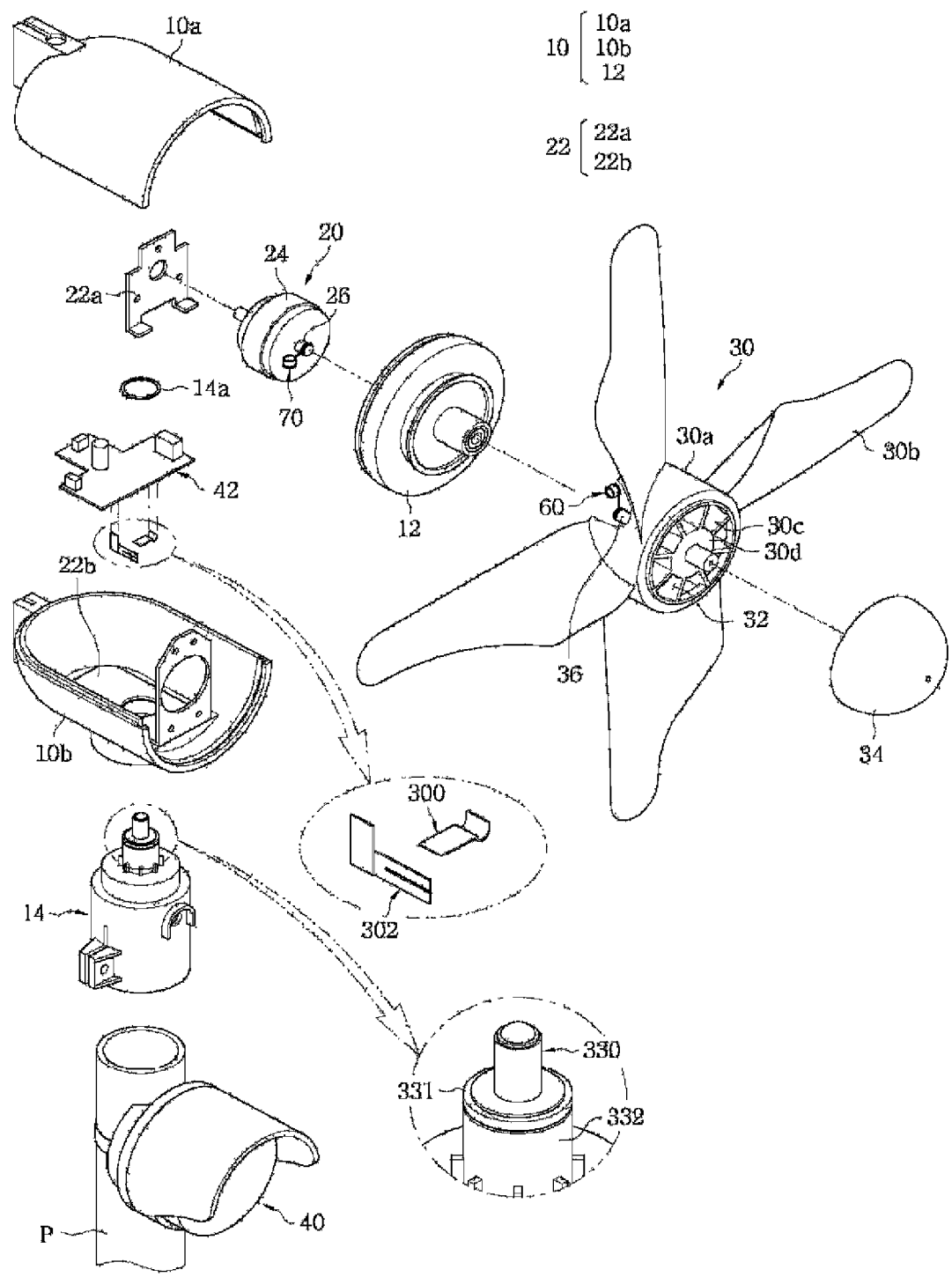

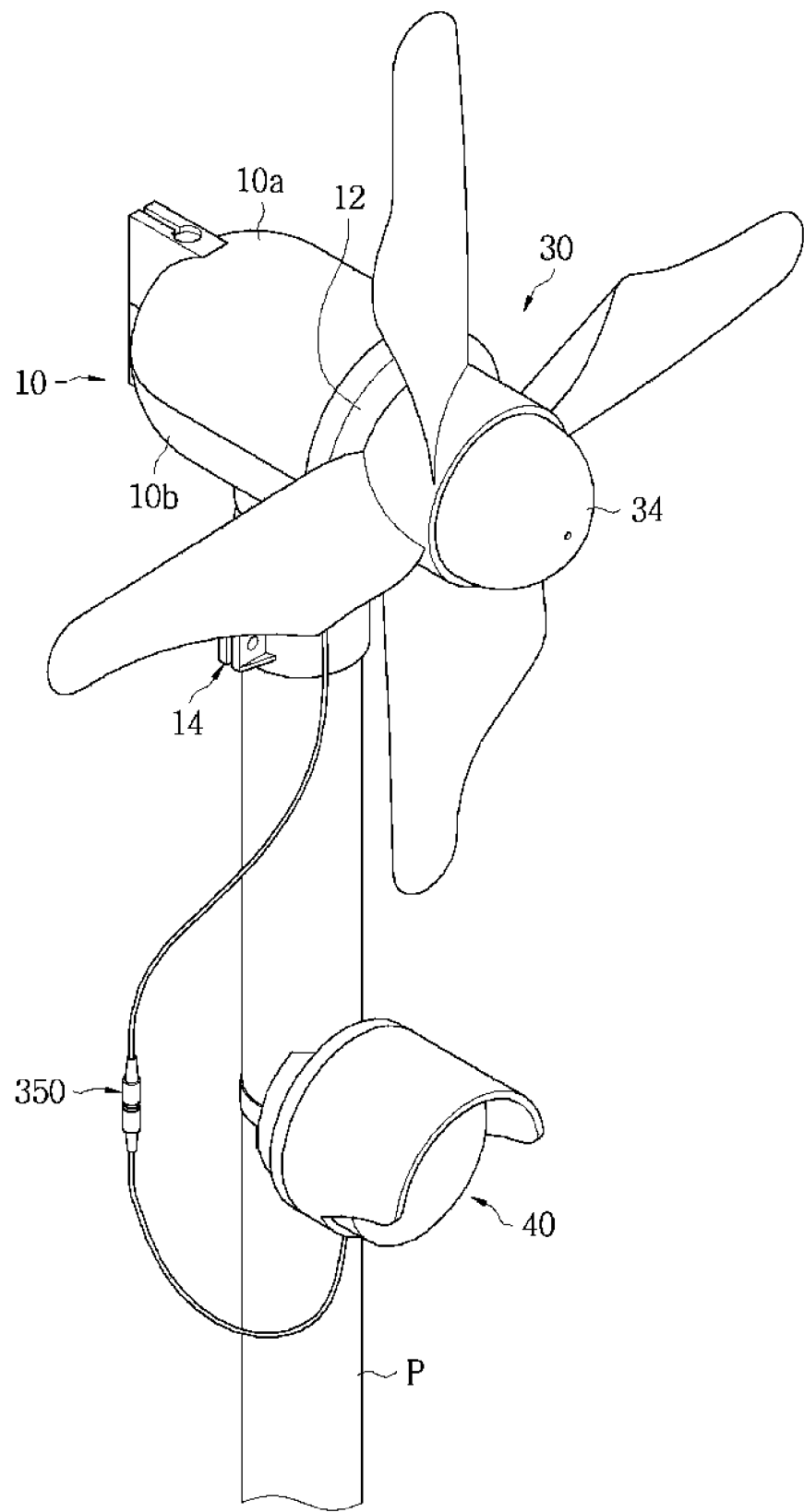
[Figure 22]

[Figure 23]
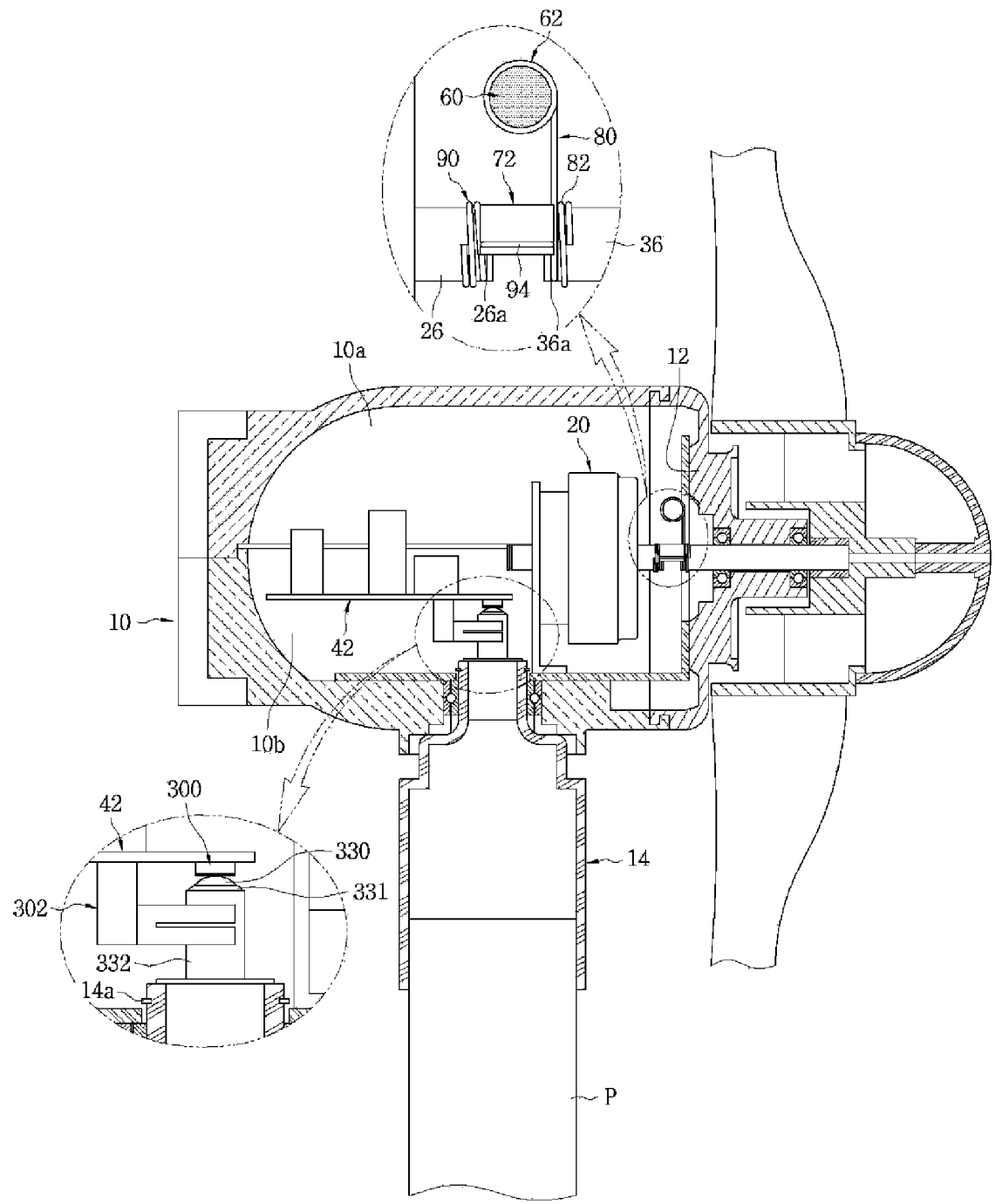

[Figure 24]
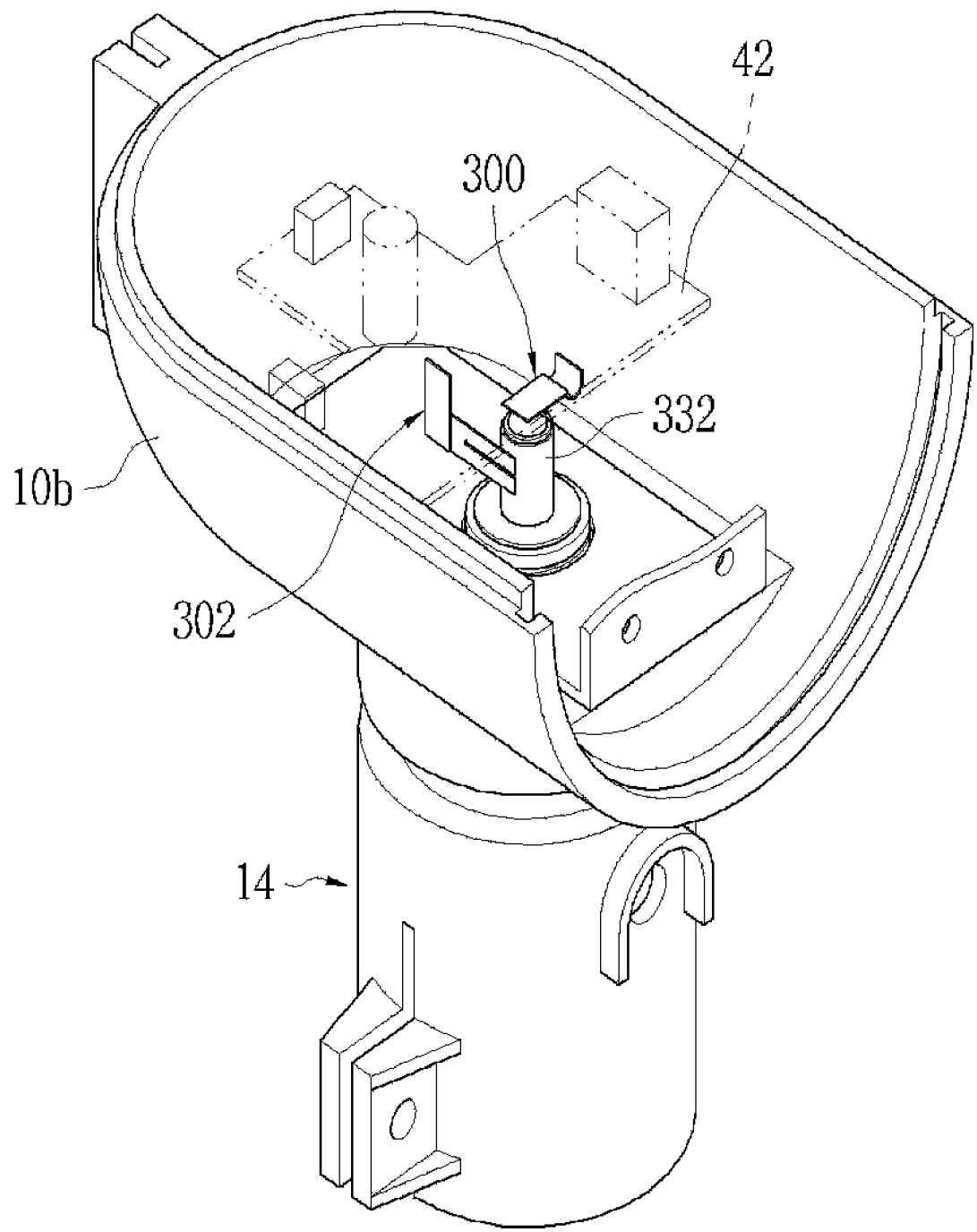

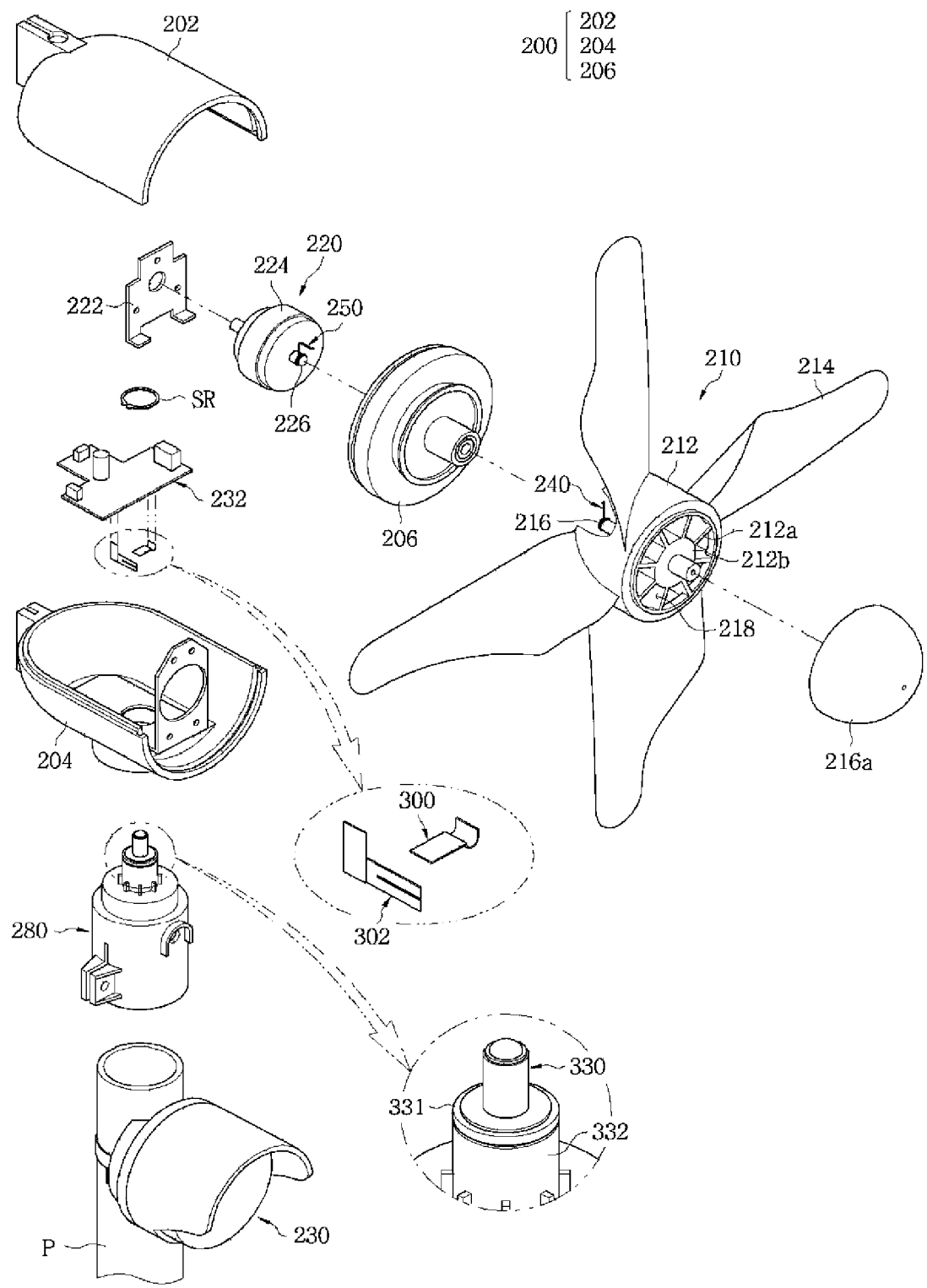
[Figure 25]

[Figure 26]
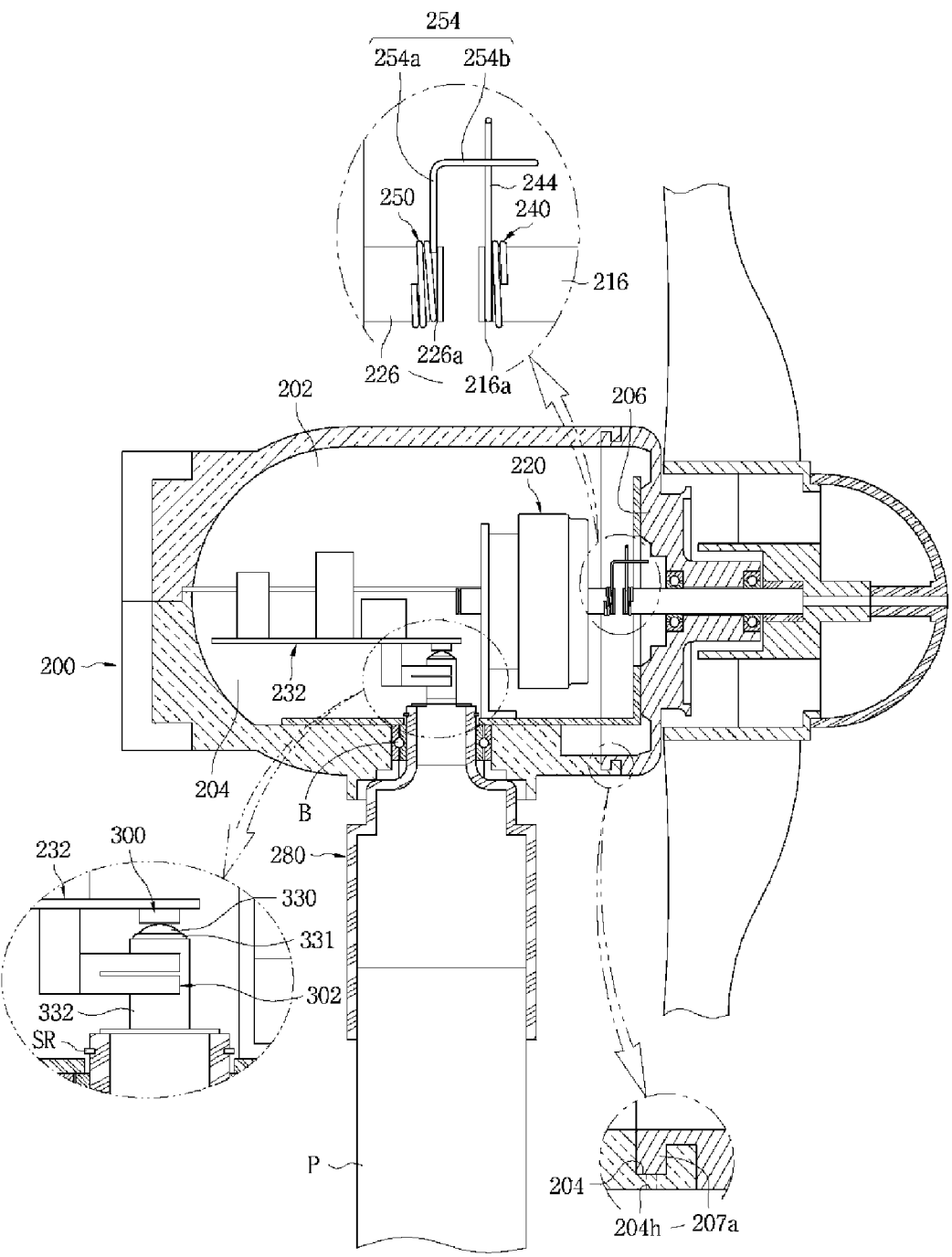

POWER TRANSMISSION APPARATUS FOR WIND POWER GENERATION AND WIND POWER GENERATOR USING THE SAME

BACKGROUND OF THE INVENTION

1. Field of the Invention

The present invention relates generally to power transmission apparatuses for wind power generation and wind power generators using the same and, more particularly, to a power transmission apparatus for wind power generation and a wind power generator using the power transmission apparatus, which is constructed such that when an impeller is rotated by wind at an initial stage, sufficient initial driving force can be applied to the impeller, so that despite the wind blowing weakly, the operation of the impeller and generating unit can easily begin. The power transmission apparatus is operated in such a way that the rotating force of the impeller is transmitted to the generating unit by a magnetic repulsive force or mechanism using power transmission springs, so that friction between parts pertaining to power transmission is prevented and the parts are prevented from becoming worn thus preventing noise and increasing the lifetime of the wind power generator, and so that a problem of an offset between shafts of the two parts pertaining to power transmission can be solved, thus fundamentally preventing malfunctioning during power transmission, thereby enhancing the efficiency of the wind power generator.

2. Description of the Related Art

Recently, on residential streets, installation of wind power generators, which have impellers to be rotated by wind and illuminators such as LEDs or the like, has increased. In such a wind power generator, an impeller is rotated by the kinetic energy of wind. The rotating force of the impeller rotates a rotor and a rotor shaft of a generating unit, which is installed in the generator body, using a power transmission apparatus including gears or the like, thus generating electricity. An illuminator, such as an LED, is turned on by the generated electricity.

Meanwhile, the wind power generator which operates the LED or the like using the mechanical energy of the impeller that is rotated by wind power may be used not only on residential streets but also in various other locations such as farms, pastures, the coast, etc.

However, in the conventional techniques, because the rotating force of the impeller is transmitted to the generating unit using the gear mechanism, a relatively large initial driving force is required. Therefore, the impeller may not be rotated by relatively weak wind, with the result that the LED is not turned on.

In other words, because the conventional techniques are constructed such that a drive gear coupled to the impeller is in surface contact with a driven gear coupled to a rotor shaft of the generating unit, the magnitude of initial driving force required for rotating the impeller at an initial stage is increased. Thus, if relatively weak wind blows, the impeller may not be smoothly rotated, because sufficient initial driving force cannot be obtained. Thereby, power generation becomes unsatisfactory. Moreover, in the case where the capacity of the rotor is relatively large, the size of the gears is also increased, so that it is very difficult to rotate the impeller using low wind power. As such, in the case where the impeller is not satisfactorily rotated, the operation of the generating unit is also unsatisfactory, with the result that the LED cannot be turned on even when necessary. That is, the reliability of the wind power generator is deteriorated. In particular, in an overpopulated city where wind is comparatively weak, it is more difficult to rotate the impeller using wind power.

As stated above, in the case where the rotating force of the impeller is transmitted to the generating unit using the gear mechanism, friction between gears is relatively large, thus resulting in an increase of a required magnitude of the initial driving force. Hence, when weak wind is blowing or in the case where the capacity of the rotor is relatively large, the impeller may not rotate smoothly. As a result, the wind power generator may not be operated even when necessary, that is, it may be useless.

Furthermore, in the conventional technique, every when the impeller rotates, friction between the parts that pertain to power transmission occurs, causing abrasion of the parts and severe noise. The abrasion of the parts pertaining to power transmission reduces the lifespan of the wind power generator.

In addition, if an offset phenomenon occurs, in which the power transmission axes of the impeller and the generating unit become misaligned because of some cause or other, the efficiency of transmitting the rotating force of the impeller to the generating unit is greatly reduced. Hence, the LED may not be satisfactorily operated. Furthermore, the offset phenomenon of the power transmission axes further increases a required magnitude of the initial driving force of the wind power generator, so that the impeller cannot rotate smoothly.

As well, in the conventional techniques using the gear mechanism, a backlash event is induced, causing momentary impact. The momentary impact is applied to critical parts of the wind power generator, thus reducing the durability thereof, and causing various other problems.

Moreover, lubricating oil may be periodically supplied into a gear box. Therefore, the maintenance of the wind power generator is inconvenient and difficult. Due to the gears, lots of noise and vibration occur.

In addition, in the daytime, due to the solar heat and frictional heat in the gear box, oil in the gear box evaporates or is exhausted by being consumed naturally. Hence, the maintenance of the wind power generator is more difficult. As well, there may be problems attributable to the loosening of bolts or screws for assembly of the critical parts. Particularly, in the case of a wind power generator having a large capacity, the operation of charging lubricating oil into a gear box is more and more inconvenient and difficult, and greater noise and vibration occur.

SUMMARY OF THE INVENTION

Accordingly, the present invention has been made keeping in mind the above problems occurring in the prior art, and an object of the present invention is to provide a power transmission apparatus for wind power generation and a wind power generator using the power transmission apparatus which does not require a large initial driving force so that an impeller for operating a generating unit can rotate smoothly despite the blowing of just a light wind, and in which even if an offset phenomenon occurs, in which power transmission axes of the impeller and the generating unit become misaligned, the rotating force of the impeller can be satisfactorily transmitted to the generating unit, thus enhancing the reliability, and which can solve a conventional problem in that momentary impact attributable a backlash event is applied to critical parts, thereby not only increasing the durability of the wind power generator but also obtaining various other advantages.

In order to accomplish the above object, in accordance with a first aspect, the present invention provides a power transmission apparatus for a wind power generator, the wind power generator including a generating unit and an impeller rotatably provided ahead of the generating unit so that the generating unit is operated by rotation of the impeller, the power transmission apparatus including: a first magnetic member provided around a rotating shaft of the impeller; and a second magnetic member provided around a rotor shaft of the generating unit, the second magnetic member disposed at a position facing the first magnetic member such that like poles of the first and second magnetic members face each other, so that when the impeller rotates, the rotor shaft of the generating unit is rotated by magnetic repulsive force between the first magnetic member and the second magnetic member. Furthermore, the present invention provides a wind power generator using the power transmission apparatus in accordance with the first aspect.

In order to accomplish the above object, in accordance with a second aspect, the present invention provides a power transmission apparatus for a wind power generator, the wind power generator including a generating unit and an impeller rotatably provided ahead of the generating unit so that the generating unit is operated by rotation of the impeller, the power transmission apparatus including: a drive winding spring provided around a circumferential outer surface of a rotating shaft of the impeller, with a drive catch part formed on one end of the drive winding spring; and a driven winding spring provided around a circumferential outer surface of a rotor shaft of the generating unit, with a driven catch part formed on one end of the driven winding spring, the driven catch part interlocking with the drive catch part of the drive winding spring such that rotating force of the impeller is transmitted to the rotor shaft of the generating unit. In addition, the present invention provides a wind power generator using the power transmission apparatus in accordance with the second aspect.

BRIEF DESCRIPTION OF THE DRAWINGS

The above and other objects, features and advantages of the present invention will be more clearly understood from the following detailed description taken in conjunction with the accompanying drawings, in which:

FIG. 1 is an exploded perspective view of a wind power generator having a power transmission apparatus using magnetic levitation force, according to a first embodiment of the present invention;

FIG. 2 is a perspective view showing the external appearance of the assembled wind power generator having the power transmission apparatus according to the first embodiment of the present invention;

FIG. 3 is an exploded perspective view showing critical parts of the first embodiment of the present invention;

FIG. 4 is a perspective view showing the assembled state of the critical parts of FIG. 3;

FIG. 5 is a sectional view showing the internal construction of the wind power generator according to the first embodiment of the present invention;

FIGS. 6 through 8 are views illustrating the transmission of the rotating force of an impeller of the wind power generator according to the first embodiment of the present invention;

FIG. 9 is a view illustrating the transmission of the rotating force of an impeller of a wind power generator according to a modification of the first embodiment of the present invention;

FIG. 10 is an exploded perspective view of critical parts of a wind power generator, according to a second embodiment of the present invention;

FIG. 11 is an assembled perspective view of the wind power generator of FIG. 10;

FIG. 12 is a side sectional view of the wind power generator of FIG. 10;

FIG. 13 is a perspective view showing a drive winding spring and a driven winding spring which are critical parts and are respectively coupled to a rotating shaft of an impeller and a rotor shaft of a generating unit according to the second embodiment of the present invention;

FIG. 14 is a perspective view of the transmission of rotating force of the rotating shaft of the impeller to the rotor shaft of the generating unit through the drive winding spring and the driven winding spring of FIG. 13;

FIG. 15 is a rear view of the impeller which is a critical part of the second embodiment of the present invention, showing the direction in which the impeller and the rotating shaft rotate and the direction in which force is applied to the drive winding spring;

FIG. 16 is a front view of the generating unit, showing the direction in which the impeller and the rotor shaft of the generating unit rotate and the direction in which force is applied to the driven winding spring according to the second embodiment of the present invention;

FIG. 17A are of views showing the direction in which the rotor shaft of the generating unit rotates and the direction in which a coil part of the driven winding spring is wound according to the second embodiment of the present invention;

FIG. 17B are of views showing the direction in which the rotating shaft of the impeller rotates and the direction in which a coil part of the drive winding spring is wound according to the second embodiment of the present invention;

FIG. 18A is a perspective view illustrating a hook of the drive winding spring, which is a critical part of the second embodiment of the present invention, showing the hook being in a state of being hooked to a driven catch part of the driven winding spring;

FIG. 18B is a perspective view illustrating a hook of the driven winding spring, which is a critical part of the second embodiment of the present invention, showing the hook being in a state of being hooked to a drive catch part of the drive winding spring;

FIG. 19 is a side sectional view showing the construction of a modification of the second embodiment of the present invention;

FIG. 20 is of side views showing the operation of a drive winding spring and a driven winding spring according to another modification of the second embodiment of the present invention;

FIG. 21 is an exploded perspective view of critical parts of a wind power generator, according to a third embodiment of the present invention;

FIG. 22 is a perspective view showing the external appearance of the assembled wind power generator of FIG. 21;

FIG. 23 is a side sectional view showing the internal construction of the third embodiment of the present invention;

FIG. 24 is a view showing the concept of critical parts of FIG. 21;

FIG. 25 is an exploded perspective view of critical parts of a wind power generator, according to a fourth embodiment of the present invention; and FIG. 26 is a side sectional view showing the internal construction of the fourth embodiment of the present invention.

DESCRIPTION OF THE PREFERRED EMBODIMENTS

Hereinafter, preferred embodiments of the present invention will be described in detail with reference to the attached drawings.

First Embodiment

Power Transmission Apparatus for Wind Power Generation Using Magnetic Levitation Force and a Wind Power Generator Using the Same FIG. 1 is an exploded perspective view of a wind power generator, according to a first embodiment of the present invention. FIG. 2 is a perspective view showing the external appearance of the assembled wind power generator having a power transmission apparatus which is a critical part of the first embodiment of the present invention. FIG. 3 is an exploded perspective view showing critical parts of the first embodiment of the present invention. FIG. 4 is a perspective view showing the assembled state of the critical parts of FIG. 3. FIG. 5 is a sectional view showing the internal construction of the wind power generator according to the first embodiment of the present invention. FIGS. 6 through 8 are views illustrating the transmission of the rotating force of an impeller 30 of the wind power generator according to the first embodiment of the present invention. FIG. 9 is a view illustrating the transmission of rotating force of an impeller 30 of a wind power generator according to a modification of the first embodiment of the present invention.

In the drawings, the reference numeral 10 denotes a casing of the wind power generator, 14 denotes a connector, 14a denotes a snap ring which rotatably couples the connector 14 to the lower end of the casing 10, 22 denotes a bracket for supporting a generating unit 20, 30 denotes the impeller, and 42 denotes a circuit board having LEDs 40 thereon.

The casing 10 includes an upper casing 10a and a lower casing 10b which have symmetrical semi-cylindrical shapes and are coupled to each other, and a front cover 12 which is coupled to the front ends of the upper and lower casings 10a and 10b. A rotating shaft 36, which is provided on the central portion of the rear surface of the impeller 30, is supported in the central portion of the front cover 12 so as to be slidable because of the use of a bearing. The rear end of the rotating shaft 36 of the impeller 30 is inserted into the casing 10.

The impeller 30 includes a center cylinder 30a and a plurality of blades 30b which are provided on the circumferential outer surface of the center cylinder 30a. Furthermore, ribs 30c which are arranged in a circumferential direction are integrally provided on the circumferential inner surface of the center cylinder 30a, and light passing holes are defined between the ribs 30c. A core 30d is provided in the center cylinder 30a at the center of the impeller 30 and is integrally coupled to the center cylinder 30a through the ribs 30c. The rotating shaft 36 is fastened to the core 30d. In addition, the rotating shaft 36 of the impeller 30 is slidably supported by the central portion of the front cover 12 of the casing 10. Thus, the impeller 30 is provided on the front end of the casing 10 so as to be rotatable and movable forwards and backwards with respect to the casing 10. A dome-shaped transparent cap 34 is coupled to the front end of the center cylinder 30a of the impeller 30.

The generating unit 20 is installed in the casing 10 and is supported by the bracket 22. The generating unit 20 generates electricity using the rotor 24 which rotates along with the rotor shaft 26.

Meanwhile, a first spring 80 is provided around the rotating shaft 36, which is provided on the central portion of the impeller 30. A first magnetic member 60 is coupled to the rotating shaft 36 through the first spring 80. In detail, the first spring 80 includes a coil part 82 which is formed by bending an elastic wire into a coil shape, and a hook-shaped holding part 84 which extends outwards from one end of the coil part 82 in a direction perpendicular to the coil part 82. The first magnetic member 60 is installed in a magnet housing 62 which is open on one end thereof.

The hook-shaped holding part 84 of the first spring 80 is fitted over the circumferential outer surface of the magnet housing 62 having the first magnetic member 60. The coil part 82 of the first spring 80 is fitted over the circumferential outer surface of the rotating shaft 36 of the impeller 30, so that the first magnetic member 60 rotates along with the impeller 30.

Furthermore, a second spring 90 is provided around the rotor shaft 26 of the generating unit 20. A second magnetic member 70 is coupled to the rotor shaft 26 through the second spring 90 such that it faces the first magnetic member 60. In detail, the second spring 90 also includes a coil part 92 which is formed by bending an elastic wire into a coil shape, and a hook-shaped holding part 94 which extends outwards from one end of the coil part 92 in a direction perpendicular to the coil part 92. The second magnetic member 70 is installed in a magnet housing 72 which is open on one end thereof, in the same manner as the installation of the first magnetic member 60.

The hook-shaped holding part 94 of the second spring 90 is fitted over the circumferential outer surface of the magnet housing 72 having the second magnetic member 70. The coil part 92 of the second spring 90 is fitted over the circumferential outer surface of the rotor shaft 26 of the generating unit 20, such that the second magnetic member 70 of the rotor shaft 26 of the generating unit 20 faces the first magnetic member 60 of the rotating shaft 36 of the impeller 30 on the same path of rotation.

Here, in the first embodiment of the present invention, the first magnetic member 60 and the second magnetic member 70 are oriented such that the like poles thereof face each other. Therefore, the rotating force of the impeller 30 is transmitted to the rotor shaft 26 of the generating unit 20 by the magnetic repulsive force between the first magnetic member 60 and the second magnetic member 70. The above construction in which the generating unit 20 is operated by magnetic repulsive force is the major point of the first embodiment of the present invention. For example, the N-pole of the first magnetic member 60 may face the N-pole of the second magnetic member 70 or, alternatively, the S-pole of the first magnetic member 60 may face the S-pole of the second magnetic member 70, so that the rotating force of the impeller 30 is transmitted to the rotor shaft 26 of the generating unit 20 by the magnetic repulsive force between the first magnetic member 60 and the second magnetic member 70.

In the first embodiment of the present invention having the above-mentioned construction, when the impeller 30 is rotated by the force of wind, the first magnetic member 60 provided on the rotating shaft 36 of the impeller 30 is rotated along with the impeller 30. Then, the second magnetic member 70, which faces the first magnetic member 60 such that the like poles thereof face each other, is also rotated by the magnetic repulsive force therebetween. Thereby, the rotating force of the impeller 30 is transmitted to the rotor shaft 26 of the generating unit 20. As a result, the generating unit 20 generates electricity, thus operating the LEDs 40 to emit light.

As such, the first embodiment of the present invention is operated in such a way that the power transmission is performed by the magnetic repulsive force generated between the first magnetic member 60 and the second magnetic member 70 which are critical parts of the present invention. Therefore, compared to the conventional technique using the gear engagement type power transmission method, friction between parts that pertain to the power transmission are reduced, and the parts pertaining to the power transmission are prevented from becoming worn by friction. Thereby, noise can be markedly reduced when the wind power generator is operated. In addition, the lifespan of the wind power generator can be increased. In other words, when the impeller 30 rotates, power is transmitted from the impeller 30 to the generating unit 20 by the non-contact power transmission method in which the critical parts that pertain to the power transmission are operated by magnetic repulsive force without coming into contact with each other. Therefore, when the wind power generator is operated, noise is prevented from occurring due to friction between the parts pertaining to the power transmission, and the parts pertaining to the power transmission are prevented from becoming worn or damaged. Thus, there are various advantages, for example, in that the lifespan of the wind power generator is extended.

As well, because the first embodiment of the present invention uses the repulsive force between the two magnetic members, a relatively low initial driving force, that is, initial rotating force, is required. Therefore, despite the blowing of a light wind, the impeller 30 can rotate smoothly, and the LEDs 40 can be turned on.

In other words, unlike the gear engagement method that requires a large initial driving force, the present invention smoothly transmits rotating force using the magnetic repulsive force between the first magnetic member 60 and the second magnetic member 70. Hence, the impeller 30 can easily rotate even in a weak wind, thus turning on the LEDs 40. In detail, under the normal conditions, when the impeller 30 is in the stopped state, a space (see, FIG. 6) is defined between the first magnetic member 60 of the rotating shaft 36 of the impeller 30 and the second magnetic member 70 of the rotor shaft 26 of the generating unit 20 by the repulsive force therebetween so that the forces of the first and second magnetic members 60 and 70 do not affect each other due to the space. From this state, when the impeller 30 is initially rotated by wind, the impeller 30 and the first magnetic member 60 can be easily rotated in the space which has been defined between the first and second magnetic members 60 and 70. Thus, after the impeller 30 and the first magnetic member 60 obtain a sufficient propulsive force, the first magnetic member 60 rotates the second magnetic member 70 using the magnetic repulsive force therebetween to rotate the rotor shaft 26 and the rotor 24 of the generating unit 20. Accordingly, despite the blowing of a light wind, the impeller 30 can smoothly rotate at the initial stage. As a result, the generating unit 20 can also be smoothly operated. As such, in the first embodiment of the present invention, a distance that the impeller 30 can preliminarily rotate is ensured by the magnetic repulsive force between the first magnetic member 60 and the second magnetic member 70, so that the impeller 30 can smoothly rotate even in a weak wind. Ultimately, the reliability of the operation of the wind power generator can be enhanced.

Moreover, in the first embodiment of the present invention, even if an offset phenomenon occurs, in which power transmission axes between the impeller 30 and the generating unit 20 become misaligned, the rotating force of the impeller 30 can be reliably transmitted to the generating unit 20, thus further enhancing the reliability of the operation of the wind power generator.

In the case of the conventional power transmission method using gear mechanism, a power transmission rate is only about 80% attributable to the surface contact between the gears, that is, power loss is relatively high. However, in the first embodiment of the present invention, the rotating force of the impeller 30 is transmitted to the generating unit 20 using the repulsive force, which is called magnetic levitation force, between the first magnetic member 60 and the second magnetic member 70. Hence, power loss can be minimized, and the efficiency of generation of electricity by the generating unit 20 can be maximized. This means that the impeller 30 can smoothly rotate even in a very weak wind so that the reliability of the operation of the wind power generator can be ensured.

According to the first embodiment of the present invention, electricity generated by the operation of the generating unit 20 of the wind power generator can be supplied to the outside. In detail, a charger is provided in the casing 10 which is one of the critical parts of the wind power generator. When the generating unit 20 is operated, the charger is charged with electricity. The charger supplies electricity to the outside through an external lead wire connected to the charger. Alternatively, an external lead wire may be directly connected to the generating unit 20 to directly supply electricity to the outside when the generating unit 20 is being operated.

Meanwhile, fitting grooves 66a and 76a are respectively formed in the circumferential outer surfaces of the magnet housings 62 and 72, which are made of synthetic resin and contain the first magnetic member 60 and the second magnetic member 70 therein. The hook-shaped holding part 84 of the first spring 80 and the hook-shaped holding part 94 of the second spring 90 are respectively fitted into the fitting grooves 26a and 36a of the magnetic housings 62 and 72. Thus, the first spring 80 and the second spring 90 are more reliably prevented from becoming removed from the magnet housings 62 and 72. Moreover, this structure is advantageous in that the first magnetic member 60 and the second magnetic member 70 are respectively prevented from being removed from the rotating shaft 36 of the impeller 30 and the rotor shaft 26 of the generating unit 20. Furthermore, each of the first spring 80 and the second spring 90 is made of an elastic wire, so that the spring itself is of a predetermined elasticity. Therefore, the hook-shaped holding part 84 of the first spring 80 and the hook-shaped holding part 94 of the second spring 90 can be tightly fitted into the seating grooves 66a and 76a of the magnet housings 62 and 72, respectively. As a result, the magnetic housings 62 and 72 and the first and second magnetic members 60 and 70 can be more reliably coupled to the rotating shaft 36 of the impeller 30 and the rotor shaft 26 of the generating unit 20.

In addition, an extension 64, 74 protrudes from the open end of at least one of the magnet housings 62 and 72 towards the open end of the remaining one. In the first embodiment, extensions 64 and 74 are respectively provided on the facing open ends of both the magnet housings 62 and 72.

Due to the above-mentioned construction, even if wind power beyond the repulsive force between the first magnetic member 60 and the second magnetic member 70 is applied to the impeller 30 and thus the first magnetic member 60 is momentarily brought into contact with the second magnetic member 70, only the extensions 64 and 74 provided on the open ends of the magnet housings 62 and 72 are in reality brought into direct contact with each other. That is, when the extensions 64 and 74 are brought into contact with each other, a gap g is defined between the first magnetic member 60 and the second magnetic member 70, thus preventing the first magnetic member 60 from coming into direct contact with the second magnetic member 70.

Therefore, while the impeller 30 is rotating, the magnetic repulsive force is prevented from becoming reduced due to the direct contact between the first magnetic member 60 and the second magnetic member 70. Thus, the reliability of the operation of the wind power generator can be further enhanced. In other words, magnets have the characteristic that if they come into direct contact with each other several times, magnetism thereof is reduced. In the present invention, in consideration of this characteristic of magnets, the extensions 64 and 74 provided on the magnet housings 62 and 72 prevent the first magnetic member 60 from coming into direct contact with the second magnetic member 70, thereby preventing a reduction in the magnetic repulsive force between the first magnetic member 60 and the second magnetic member 70. Accordingly, efficiency of the transmission of the rotating force of the impeller 30 to the generating unit 20 can be continuously maintained. Thereby, the reliability of the operation of the wind power generator can be ensured. In brief, in the present invention, the magnetism of the two magnetic members 60 and 70 can be fundamentally prevented from being reduced due to direct contact occurring therebetween.

When the impeller 30 is initially rotated, the extensions 64 and 74 of the magnet housings 62 and 72 prevent impact force from being applied to the first magnetic member 60 and the second magnetic member 70 by momentary collision therebetween. Therefore, the magnetic members 60 or 70 can be prevented from being damaged or broken by the impact.

Moreover, because the repulsive force between the first magnetic member 60 and the second magnetic member 70 is increased as they become closer to each other, even if the extensions 64 and 74 should come into contact with each other, impact is prevented from affecting the first magnetic member 60 or the second magnetic member 70.

In the first embodiment of the present invention, although the first and second magnet housings 62 and 72 have been illustrated as respectively having the extensions 64 and 74, only one of the first and second magnet housings 62 and 72 may have the extension 64 or 74.

Meanwhile, fitting grooves 26a and 36a are respectively formed in the circumferential outer surfaces of the rotating shaft 36 of the impeller 30 and the rotor shaft 26 of the generating unit 20. When the first spring 80 and the second spring 90 are respectively fitted over the rotating shaft 36 and the rotor shaft 26, the coil part 82 of the first spring 80 is fitted into the fitting grooves 36a of the rotating shaft 36 of the impeller 30, and the coil part 92 of the second spring 90 is fitted into the fitting grooves 26a of the rotor shaft 26 of the generating unit 20. In the present invention, the coil part 82 of the first spring 80 is formed by bending the elastic wire into a spiral shape which has been wound several times. A portion of the coil part 82, for example, the first turn portion of the end of the coil part 82, is seated into the fitting groove 36a of the rotating shaft 36 of the impeller 30. The coil part 92 of the second spring 90 is also formed by bending the elastic wire into a spiral shape which has been wound several times, and a portion of the coil part 92, for example, the first turn portion of the end of the coil part 92, is seated into the fitting groove 26a of the rotor shaft 26 of the generating unit 20. Therefore, the first spring 80, the first magnetic member 60, the second spring 90 and the second magnetic member 70 can be prevented from becoming undesirably displaced from their correct positions.

FIG. 9 is a view illustrating the transmission of rotating force of an impeller 30 of a wind power generator according to a modification of the first embodiment of the present invention. Referring to FIG. 9, each of facing surfaces of a first magnetic member 60 and a second magnetic member 70 is inclined towards the center of the impeller 30. In FIG. 9, the opposite surfaces of each of the first magnetic member 60 and the second magnetic member 70 are inclined towards the center of the impeller 30.

In the wind power generator of FIG. 9, the facing surfaces of the first magnetic member 60 and the second magnetic member 70 are parallel to the diametrical line based on the center of the impeller 30, in other words, based on the center of the rotation trajectories of the first magnetic member 60 and the second magnetic member 70. Therefore, when the impeller 30 is operated, that is, rotated, at an initial stage, the magnetic repulsive force between the two magnetic members 60 and 70 is generated in the circumferential direction of the impeller 30 or the rotor shaft 26 of the generating unit 20. Thus, an initial driving distance between the first magnetic member 60 and the second magnetic member 70 can be more reliably ensured.

Furthermore, in the present invention, despite the blowing of only a light wind, the impeller 30 can be rotated and the generating unit 20 can be operated to generate electricity. Hence, the amount of electricity which can be accumulated is markedly increased.

In addition, because the magnet housings 62 and 72 are respectively supported by the springs 80 and 90 in such a way that the springs 80 and 90 are wound around the corresponding magnet housings 62 and 72, the magnet housings 62 and 72 can be reliably prevented from being undesirably removed by the centrifugal force.

Second Embodiment

Power Transmission Apparatus for Wind Power Generation Using an Improved Winding Spring and a Wind Power Generator Using the Same FIG. 10 is an exploded perspective view of critical parts of a wind power generator, according to a second embodiment of the present invention. FIG. 11 is an assembled perspective view of the wind power generator of FIG. 10. FIG. 12 is a side sectional view of the wind power generator of FIG. 10. FIG. 13 is a perspective view showing a drive winding spring 240 and a driven winding spring 250 which are critical parts and are respectively coupled to a rotating shaft 216 of an impeller 210 and a rotor shaft 226 of a generating unit 220 according to the second embodiment of the present invention. FIG. 14 is a perspective view of the transmission of rotating force of the rotating shaft 216 of the impeller 210 to the rotor shaft 226 of the generating unit 220 through the drive winding spring 240 and the driven winding spring 250 of FIG. 13. FIG. 15 is a rear view of the impeller 210 which is a critical part of the second embodiment of the present invention, showing the direction in which the impeller 210 and the rotating shaft 216 rotate and the direction in which force is applied to the drive winding spring 240. FIG. 16 is a front view of the generating unit 220, showing the direction in which the impeller 210 and the rotor shaft 226 of the generating unit 220 rotate and the direction in which force is applied to the driven winding spring 250 according to the second embodiment of the present invention. FIG. 17A are of views showing the direction in which the rotor shaft 226 of the generating unit 220 rotates and the direction in which a coil part 252 of the driven winding spring 250 is wound according to the second embodiment of the present invention. FIG. 17B are of views showing the direction in which the rotating shaft 226 of the impeller 220 rotates and the direction in which a coil part 242 of the drive winding spring 240 is wound according to the second embodiment of the present invention. FIG. 18A is a perspective view illustrating a hook 246 of the drive winding spring 240, which is a critical part of the second embodiment of the present invention, showing the hook 246 being in a state of being hooked to a driven catch part 254 of the driven winding spring 250. FIG. 18B is a perspective view illustrating a hook 256 of the driven winding spring 250, which is a critical part of the second embodiment of the present invention, showing the hook 256 being in a state of being hooked to a drive catch part 244 of the drive winding spring 240. FIG. 19 is a side sectional view showing the construction of a modification of the second embodiment of the present invention. FIG. 20 is of side views showing the operation of a drive winding spring 240 and a driven winding spring 250 according to another modification of the second embodiment of the present invention.

As shown in FIGS. 10 through 20, the wind power generator having the power transmission apparatus using the improved winding springs according to the second embodiment of the present invention includes a casing 200, the impeller 210 which is rotatably mounted to the front end of the casing 200 and has light passing holes 218 on the central portion thereof, and the generating unit 220 which is installed in the casing 200. LEDs 230 are electrically connected to the generating unit 220 and disposed at positions facing the light passing holes 218 of the impeller 210. The wind power generator further includes the drive winding spring 240 which has the drive catch part 244 on one end thereof and is fitted over the circumferential outer surface of the rotating shaft 216 provided on the impeller 210, and the driven winding spring 250 which has the driven catch part 254 on one end thereof and is fitted over the circumferential outer surface of the rotor shaft 226 provided on the generating unit 220. The drive catch part 244 of the drive winding spring 240 is hooked to the driven catch part 254 of the driven winding spring 250 such that rotating force of the impeller 210 can be transmitted to the rotor shaft 226 of the generating unit 220.

In the second embodiment of the present invention, the term 'power transmission using winding springs' means that the rotating force of the impeller 210 is transmitted to the generating unit 220 through the drive winding spring 240 and the driven winding spring 250 which are coil-shaped springs.

The casing 200 includes an upper casing 202 and a lower casing 204 which have symmetrical semi-cylindrical shapes and are coupled to each other, and a front cover 206 which is coupled to the front ends of the upper and lower casings 202 and 204. The rotating shaft 216, which is provided on the central portion of the rear surface of the impeller 210, is supported in the central portion of the front cover 206 so as to be slidable because of the use of a bearing. The rear end of the rotating shaft 216 of the impeller 210 is inserted into the casing 200.

The impeller 210 includes a center cylinder 212 and a plurality of blades 214 which are provided on the circumferential outer surface of the center cylinder 212. Furthermore, ribs 212a which are arranged in a circumferential direction are integrally provided on the circumferential inner surface of the center cylinder 212, and the light passing holes 218 are defined between the ribs 212a. A core 212b is provided in the center cylinder 212 at the center of the impeller 210 and is integrally coupled to the center cylinder 212 by the ribs 212a. The rotating shaft 216 is fastened to the core 212b. In addition, the rotating shaft 216 of the impeller 210 is slidably supported by the central portion of the front cover 206 of the casing 200. Thus, the impeller 210 is provided on the front end of the casing 200 so as to be rotatable and movable forwards and backwards with respect to the casing 200. A dome-shaped transparent cap 216a is coupled to the front end of the center cylinder 212 of the impeller 210.

The generating unit 220 is installed in the casing 200 and is supported by the bracket 222. The generating unit 220 generates electricity using the rotor 224 which rotates along with the rotor shaft 226. In detail, the rotor shaft 226 of the generating unit 220 is coupled to the rotating shaft 216 of the impeller 210 through the drive winding spring 240 and the driven winding spring 250 which will be explained in detail later. When the impeller 210 rotates, the rotor 224 is rotated by the rotating shaft 216 of the impeller 210 and the rotor shaft 226, thus generating electricity. A typical generator which generates electricity using rotation of a rotor can be used as the generating unit 220, therefore further explanation of the generating unit 220 is deemed unnecessary.

The drive winding spring 240 includes the coil part 242 which is formed by bending an elastic wire into a coil shape, and a drive catch part 244 which extends from one end of the coil part 242. The coil part 242 of the drive winding spring 240 is fitted over the circumferential outer surface of the rotating shaft 216 of the impeller 210.

The driven winding spring 250 includes the coil part 252 which is formed by bending an elastic wire into a coil shape, and the driven catch part 254 which extends from one end of the coil part 252. The driven catch part 254 includes a radial driven catch part 254a which extends from the end of the coil part 252 in a direction crossing the longitudinal direction of the rotor shaft 226 of the generating unit 220, and an axial driven catch part 254b which extends from the end of the radial driven catch part 254a in a direction parallel to the longitudinal direction of the rotor shaft 226. The coil part 252 of the driven winding spring 250 is fitted over the circumferential outer surface of the rotor shaft 226 of the generating unit 220, so that the drive catch part 244 of the drive winding spring 240 and the axial driven catch part 254b of the driven winding spring 250 become interlocked.

Here, because each of the drive winding spring 240 and the driven winding spring 250 is formed by bending an elastic wire, the spring itself is of a predetermined elasticity. As well, the drive catch part 244 of the drive winding spring 240 comes into point contact with the axial driven catch part 254b of the driven winding spring 250. When the impeller 210 moves forwards or backwards while rotating, the drive winding spring 240 also moves forwards or backwards. At this time, the drive catch part 244 of the drive winding spring 240 moves with respect to the axial driven catch part 254b of the driven winding spring 250 in the state in which they are in point contact with each other.

In the second embodiment of the present invention having the above-mentioned construction, when wind power rotates the impeller 210, the drive winding spring 240 of the rotating shaft 216 of the impeller 210 is also rotated, and the drive catch part 244 of the drive winding spring 240 comes into contact with the driven catch part 254 of the driven winding spring 250. The rotating force of the impeller 210 is transmitted to the generating unit 220 through the interlock between the drive catch part 244 and the driven catch part 254. Thereby, the rotor 224 and the rotor shaft 226 of the generating unit 220 are rotated, thus generating electricity. The generated electricity is supplied to the LEDs 230, thus emitting light.

Here, the drive winding spring 240 and the driven winding spring 250 which are critical parts of the second embodiment transmit the rotating force of the impeller 210 to the generating unit 220 using the interlock therebetween, unlike the conventional power transmission method using the gear engagement. Therefore, the initial driving force required for initially rotating the impeller 210 is reduced, when compared with the gear engagement type power transmission method. Thus, despite the blowing of just a light wind, the impeller 210 can smoothly rotate and the LEDs 230 are turned on.

In other words, the power transmission apparatus, which transmits the rotating force of the rotating shaft 216 of the impeller 210 that is rotated by wind power to the rotor shaft 226 of the generating unit 220, includes the drive winding spring 240 and the driven winding spring 250 which are interlocked and rotate together. Therefore, an angular space of about 350°, within which the rotating shaft 216 and the rotor shaft 226 can rotate with respect to each other, is ensured therebetween. Thus, the impeller 210 can easily rotate even in a weak wind and turn on the LEDs 230. That is, when the impeller 210 and the rotating shaft 216 are initially rotated, they obtain sufficient propulsive force and, thereafter, the drive catch part 244 of the drive winding spring 240 comes into contact with the driven catch part 254 of the driven winding spring 250 to rotate the rotor shaft 226 and the rotor 224 of the generating unit 220. Accordingly, even though the initial driving force is relatively low due to low wind power, the impeller 210 can smoothly rotate and operate the LEDs 230.

Furthermore, in the present invention, even if an offset phenomenon occurs, in which power transmission axes between the impeller 210 and the generating unit 220 have become misaligned, the rotating force of the impeller 210 can be reliably transmitted to the generating unit 220, thus further enhancing the reliability of the operation of the wind power generator.

In addition, in the second embodiment of the present invention, because the drive winding spring 240 and the driven winding spring 250 themselves are of predetermined elasticities, momentary impact attributable to a backlash event is prevented from affecting the critical parts. Therefore, the durability of the wind power generator is very much higher than the conventional technique.

In the case of the conventional power transmission method using a gear mechanism, a power transmission rate is only about 80% attributable to the surface contact between the gears, that is, power loss is relatively high. However, in the second embodiment of the present invention, the rotating force of the impeller 210 is transmitted to the generating unit 220 through the drive winding spring 240 and the driven winding spring 250 which come into point contact with each other. Hence, power loss can be minimized, and the electricity generation efficiency of the generating unit 220 can be maximized. This means that the impeller 210 can smoothly rotate even in a very weak wind.

Meanwhile, the hook 246 is formed by bending the end of the drive catch part 244 of the drive winding spring 240 in a direction perpendicular to the drive catch part 244. The hook 256 is formed by bending the end of the axial driven catch part 254b of the driven winding spring 250 in a direction perpendicular to the axial driven catch part 254b. When the rotor 224 rotates, the hook 246 of the drive winding spring 240 and the hook 256 of the driven winding spring 250 are hooked to each other. Therefore, the interlocking state between the drive winding spring 240 and the driven winding spring 250 can be maintained more reliably.

In other words, in the case where an overload which is of a degree to which the generating unit 220 is not damaged is applied to the generating unit 220, even if the driven winding spring 250 is lifted in the direction in which the overload is applied to the generating unit 220, or the drive winding spring 240 is lifted in the direction opposite the direction in which the overload is applied thereto, the state in which power can be transmitted between the drive winding spring 240 and the driven winding spring 250 can be maintained, because the hook 246 of the drive winding spring 240 and the hook 256 of the driven winding spring 250 are in the state of being hooked to each other.

Referring to FIG. 18, when a force which is greater than the force applied to the drive winding spring 240 and the driven winding spring 250 under the normal conditions is applied to the rotor shaft 226 of the generating unit 220, the drive catch part 244 of the drive winding spring 240 or the driven catch part 254 of the driven winding spring 250 gets bent (or inclined) at a predetermined angle (in the case where the driven catch part 254 of the driven winding spring 250 is bent, the angle is designated by the character a, and in the case where the drive catch part 244 of the drive winding spring 240 is bent, the angle is designated by the character b). As such, even if the drive winding spring 240 and/or the driven winding spring 250 is bent or inclined, the hook 246 of the drive winding spring 240 and the hook 256 of the driven winding spring 250 function to prevent the catch parts 244 and 254 of the springs 240 and 250 from becoming released from the interlocked state. Hence, power transmission between the drive winding spring 240 and the driven winding spring 250 can be more reliably ensured.

Of course, in the case where the drive catch part 244 of the drive winding spring 240 and the driven catch part 254 the driven winding spring 250 are bent at the same time by external force, the hook 246 of the drive winding spring 240 and the hook 256 of the driven winding spring 250 are also hooked to each other to prevent the catch parts 244 and 254 of the springs 240 and 250 from becoming released from the interlocked state, although this case is not shown in the drawings.

In other words, to enhance the reliability of the operation of the generator, the second embodiment of the present invention is characterized in that the hooks 246 and 256 are formed by bending the ends of the drive winding spring 240 and the driven winding spring 250 such that even if, due to some overload applied to the rotor shaft 226 of the generating unit 220, the driven winding spring 250 is bent in the direction in which the rotating shaft 216 rotates or the drive winding spring 240 of the rotating shaft 216 of the impeller 210 is bent in the direction opposite the direction in which the rotating shaft 216 rotates, the interlocked state between the drive winding spring 240 and the driven winding spring 250 can be maintained.

Meanwhile, the hook 246 of the drive winding spring 240 is preferably designed such that when the bearing installed in the generating unit 220 is damaged or excessive rotating overload attributable to a violent gust of wind is applied to the drive winding spring 240, the hook 246 can be released from the driven catch part 254, in detail, the axial driven catch part 254b of the driven winding spring 250. In the same manner, preferably, the hook 256 of the driven winding spring 250 is also designed such that when excessive rotating overload is applied to the driven winding spring 250, the hook 256 can be released from the driven catch part 254 of the drive winding spring 240. Because of the above-mentioned design, the rotor shaft 226 of the generating unit 220 can be prevented from becoming completely stuck and thus malfunctioning.

Furthermore, fitting grooves 216a and 226a are respectively formed in the circumferential outer surface of the rotating shaft 216 of the impeller 210 and the rotor shaft 226 of the generating unit 220. The coil part 242 of the drive winding spring 240 and the coil part 252 of the driven winding spring 250 are respectively fitted into the fitting grooves 216a and 226a when they are respectively coupled to the rotating shaft 216 of the impeller 210 and the rotor shaft 226 of the generating unit 220. Therefore, the drive winding spring 240 and the driven winding spring 250 can be reliably retained at their correct positions.

In the second embodiment of the present invention, the coil part 242 of the drive winding spring 240 is formed by bending the elastic wire in a spiral shape by winding about three times. A first turn portion of the end of the coil part 242 is seated into the fitting groove 216a of the rotating shaft 216 of the impeller 210. The coil part 252 of the driven winding spring 250 is also formed by bending the elastic wire in a spiral shape that has been wound about three times, and a first turn portion of the end of the coil part 252 is seated into the fitting groove 226a of the rotor shaft 226 of the generating unit 220.

As such, because the first turn portion of each annular coil part 242, 252 is fitted into the corresponding fitting groove 216a, 226a, the drive winding spring 240 and the driven winding spring 250 can be respectively prevented from becoming removed from the rotating shaft 216 of the impeller 210 and from the rotor shaft 226 of the generating unit 220. Annular turned portions of the coil parts 242 and 252, other than the first turn portions seated into the fitting grooves 216a and 226a, are respectively fitted over the circumferential outer surfaces of the rotating shaft 216 of the impeller 210 and the rotor shaft 226 of the generating unit 220 at positions escaped from the fitting grooves 216a and 226a. Therefore, when the impeller 210 rotates, the coil parts 242 and 252 are respectively prevented from slipping with respect to the rotating shaft 215 and the rotor shaft 226, thus preventing errors in the transmission of the rotating force of the impeller 210 to the generating unit 220.

Furthermore, a retaining ring 260 (for example, a snap ring) is fitted into each of the fitting groove 226a of the rotor shaft 226 of the generating unit 220 and the fitting groove 216a of the rotating shaft 216 of the impeller 210. The retaining rings 260 function as locking members which lock the coil parts 242 and 252 of the drive winding spring 240 and the driven winding spring to the fitting grooves 216a and 226a. Therefore, the drive winding spring 240 and the driven winding spring 250 can be more reliably prevented from becoming displaced from their correct positions.

In addition, a linear bearing 270 may be provided on at least one of the drive catch part 244 of the drive winding spring 240 and the driven catch part 254 of the driven winding spring 250 so as to be slidable with respect to the drive catch part 244, 254. In this case, when the drive catch part 244 of the drive winding spring 240 and the driven catch part 254 of the driven winding spring 250 come into contact with each other and linearly move with respect to each other, friction therebetween can be reduced by the linear bearing 270. Hence, the drive catch part 244 of the drive winding spring 240 and the driven catch part 254 of the driven winding spring 250 can be prevented from becoming worn by the accumulation of friction therebetween. The prevention of wear between the parts means that loss of the rotating driving force of the impeller 210 can be minimized and thus the power transmission efficiency can be maximized.

Meanwhile, the casing 200 is formed by coupling the upper casing 202 and the lower casing 204 which have symmetrical semi-cylindrical shapes to each other. The hemispheric front cover 206 is coupled to the front ends of the upper and lower casings 202 and 204. As shown in FIG. 12, an outer stopper 202a, from which an inner extension 202b extends inwards, is provided on an end of the upper casing 202 which faces the lower casing 204. An inner stopper 204a, from which an outer extension 204b projects outwards, is provided on an end of the lower casing 204 which faces the upper casing 202. The outer stopper 204a and the inner stopper 202a engage with each other. Here, the height of the outer stopper 202a is greater than that of the inner stopper 204a. Thus, a space s is defined between the inner stopper 204a and the inner extension 202b. Even if rainwater enters the casing 200, the space s stops the rainwater such that more rainwater can no longer enter the casing 200.

In other words, the space s functions as a water blocking groove to prevent water from entering the casing 200, thereby preventing critical parts, such as the generating unit 220, the circuit board 232, etc., from being damaged by water.

Furthermore, coupling grooves 202c and 204c are respectively formed in the circumferential inner surfaces of the front end of the upper casing 202 and the lower casing 204. A locking protrusion 207a is provided on the circumferential outer surface of the rear end of the front cover 206 which is coupled to the front ends of the upper and lower casing 202 and 204 and supports the circuit board 232 having the LEDs 230. The locking protrusion 207a of the front cover 206 is fitted into the coupling grooves 202c and 204c of the upper and lower casings 202 and 204. In addition, a drain hole 204h is formed in the coupling groove 204c of the lower casing 204, so that even if water permeates between the front cover 206 and the upper and lower casings 202 and 204, the water flows along the coupling hole 204c of the lower casing 204 and is drained outside the casing 200 through the drain hole 204h, thus more reliably preventing water from entering the casing 200.

Moreover, the rotating shaft 216 which is fastened to the center cylinder 212 of the impeller 210 is rotatably coupled to the front cover 206 of the casing 200. A flange part 206a is provided on the front end of the front cover 206 which faces the rear end of the center cylinder 212 of the impeller 210. The flange part 206a has a tapered shape which extends in diameter from the rear end of the front cover 206 to the front end. The flange part 206a of the front cover 206 is inserted into the center cylinder 212 of the impeller 210. Thanks to the flange part 206a of the front cover 206, water is prevented from entering between the front end of the casing 200 and the central portion of the impeller 210, when it rains, for example.

In other words, the flange part 206a provided on the front cover 206 of the casing 200 functions to stop water that enters the center cylinder 212 of the impeller 210, thus preventing water from entering the casing 200, for example, when it rains.

Meanwhile, in the second embodiment of the present invention, a small charger which is a secondary battery may be provided in the casing 200 which is one of the critical parts of the wind power generator. The small charger is electrically connected to the generating unit 220. In this case, when the impeller 210 rotates, the charger is charged with electricity. Under conditions of no wind, that is, when the impeller 210 is not in operation, the LEDs 230 emit light using electricity which has been charged into the small charger.

Furthermore, in the second embodiment of the present invention, the casing 200 is coupled to a support holder 280 so as to be rotatable through a bearing B. A snap ring SR is fitted over the upper end of the support holder 280 to prevent the casing 200 from becoming undesirably removed from the support holder 280. The lower end of the support holder 280 is coupled to a post P. The wind power generator of the present invention is installed on a desired location by the post P. Here, because the casing 200 is coupled to the post P through the support holder 280 which rotatably supports the casing 200, the casing 200 and the impeller 210 of the present invention can be rotated together on the post P when wind is blowing. In other words, the casing 200 and the impeller 210 can rotate depending on the direction in which the wind is blowing, so that the direction of the wind can be easily discerned.

The wind power generator of the present invention may be used for a decorative purpose. Alternatively, a separate charger may be provided in the post P which rotatably supports the casing 200, such that the charger can be connected to a battery of a vehicle or the like to charge the battery with electricity generated by wind power. In addition, the wind power generator may be used for charging a battery of a small ship with electricity or for charging an emergency battery of a small base station with electricity. As well, the wind power generator is compatible with being used in various locations which require a battery charge.

Meanwhile, the impeller 210 rotates in one-way direction. Therefore, as shown in FIGS. 13 and 17a, the coil part 252 of the driven winding spring 250, which is provided on the rotor shaft 226 of the generating unit 220, is preferably wound around the rotor shaft 226 in the same direction (that is, the direction indicated by ①) as the direction (of the arrow A) in which the rotor shaft 226 rotates. As shown in FIGS. 13 and 17b, the coil part 242 of the drive winding spring 240 which is provided on the rotating shaft 216 of the impeller 210 is preferably wound around the rotating shaft 216 in the direction (that is, the direction indicated by ②) opposite the direction (of the arrow A) in which the rotating shaft 216 of the impeller 210 rotates.

Then, when the rotating shaft 216 and the rotor shaft 226 of the generating unit 220 are rotated by the rotation of the impeller 210 in the direction of the arrow A of FIG. 14, force is applied to the drive catch part 244 of the drive winding spring 240 in the direction of F1, and force is applied to the driven catch part 254 of the driven winding spring 250 in the direction of F2, as shown in FIGS. 14 through 16. In other words, when the impeller 210 rotates, force is applied to the coil part 242 of the drive winding spring 240 and the coil part 252 of the driven winding spring 250 in the directions in which they are more firmly wound around the circumferential outer surfaces of the rotating shaft 216 of the impeller 210 and the rotor shaft 226 of the generating unit 220. Hence, the drive winding spring 240 and the driven winding spring 250 are prevented from slipping on the circumferential outer surfaces of the rotating shaft 216 of the impeller 210 and the rotor shaft 226 of the generating unit 220 while the impeller 210 rotates. Moreover, because the drive winding spring 240 and the driven winding spring 250 themselves have elasticity, as a rotating load applied to the rotating shaft 216 of the impeller 210 and the rotor shaft 226 of the generating unit 220 increases, the force with which the springs 240 and 250 are respectively wound around the rotating shaft 216 and the rotor shaft 226 also increases.

FIGS. 21 through 24 are views illustrating a wind power generator, according to a third embodiment of the present invention. Referring to FIGS. 21 through 24, the wind power generator according to the third embodiment includes a circuit board 42 which is electrically connected to a generating unit 20, a first connection piece 300 and a second connection piece 302 which are mounted to the circuit board 42, and a post P which rotatably supports a lower end of a casing 10. The wind power generator further includes a first terminal 330 and a second terminal 332 which are provided on the post P and are in contact with the first and second connection pieces 300 and 302, and an LED 40 which is mounted to the post P and is electrically connected to the first and second terminals 330 and 332.

The first connection piece 300 is made of conductive metal of a predetermined elasticity. A first end of the first connection piece 300 is soldered to the lower surface of the circuit board 42. A second end of the first connection piece 300 is brought into elastic contact with the upper end of the first terminal 330, which has a short pipe shape.

The second connection piece 302 is made of conductive metal of a predetermined elasticity and has an L shape. A first end of the second connection piece 302 is soldered to the lower surface of the circuit board 42, and a second end thereof is brought into elastic contact with the circumferential outer surface of the second terminal 332, which has a short pipe shape.

A connector 14 is coupled to the lower end of the casing 10 so as to be rotatable thanks to the use of a bearing. The connector 14 is coupled to the post P by a coupler and a bracket. The post P is installed upright on a desired location. Thus, the casing 10 and the impeller 30 can be rotated on the post P in the horizontal direction.

The first terminal 330 and the second terminal 332 which have short pipe shapes are provided on the upper end of the connector 14. Electric wires are electrically connected between the first and second terminals 330 and 332 and the LED 40, which is mounted to the post P by a coupler and a bracket. Here, a separate plug-socket unit 350 is provided on the electric wires, so that the electric wires can be connected to or disconnected from each other by the plug-socket unit 350.

In the third embodiment of the present invention having the above-mentioned construction, when wind blows, the casing 10 and the impeller 30 are rotated by wind on the post P in the horizontal direction. At this time, the first and second connection pieces 300 and 302 can always maintain the state of being respectively elastically connected to the first and second terminals 330 and 332, which are provided on the upper end of the post P. When the impeller 30 rotates on its own axis, the generating unit 20 generates electricity and supplies it to the LED 40 mounted to the post P.

Here, the second connection piece 302, which is soldered to the circuit board 42 and is in elastic contact with the circumferential outer surface of the second terminal 332, is oriented in a direction parallel to the front and rear direction of the casing 10.

Therefore, even if the casing 10 and the impeller 30 move in a vertical direction, the second connection piece 302 is prevented from being disconnected from the second terminal 332. Thus, connection failure between the generating unit 20 and the LED 40 attributable to the disconnection of the second connection piece 302 from the second terminal 332 can be prevented.

FIGS. 25 and 26 are views illustrating a fourth embodiment of the present invention. A wind power generator of FIGS. 25 and 26 includes a first connection piece 300 and a second connection piece 302 which are mounted to a circuit board 232 which are electrically connected to a generating unit 220, and a post P which rotatably supports a casing 200 which has the generating unit 220 and the circuit board 232 therein. The wind power generator further includes a first terminal 330 and a second terminal 332 which are provided on the post P and are respectively in contact with the first and second connection pieces 300 and 302. A LED 230 is mounted to the post P and is electrically connected to the first terminal 330 and the second terminal 332. The general construction of the wind power generator of FIGS. 25 and 26, other than having a drive winding spring 240 and a driven winding spring 250 as a power transmission means, remains the same as that of the embodiment of FIGS. 21 through 25, therefore further explanation is deemed unnecessary.

As described above, a power transmission apparatus for wind power generation using magnetic levitation force and a wind power generator using the same according to a first embodiment of the present invention has the following aspects.

First, a non-contact power transmission method is used, in which power is transmitted from an impeller to a generating unit by magnetic repulsive force (that is, magnetic levitation force) between a first magnetic member and a second magnetic member. Therefore, when the wind power generator is operated, noise is prevented from occurring due to friction between parts that pertain to the power transmission. The parts that pertain to the power transmission are prevented from becoming worn, thus extending the lifespan of the wind power generator.

Second, because rotating force of the impeller is transmitted to the generating unit using repulsive force between the two magnetic members, when the impeller initially rotates, the impeller can obtain a sufficient initial driving force. Therefore, despite the blowing of a weak wind, the operation of the impeller and the generating unit can begin. In other words, compared to a gear engagement type power transmission method, the initial driving force required for rotating the impeller at an initial stage can be reduced. Thus, despite the blowing of a light wind, the impeller can smoothly rotate and the generating unit can be smoothly operated.

In detail, under the normal conditions, when the impeller is in the stopped state, a space is defined between the first magnetic member of the rotating shaft of the impeller and the second magnetic member of the rotor shaft of the generating unit by the repulsive force therebetween so that the forces of the first and second magnetic members do not affect each other due to the space. From this state, when the impeller is initially rotated by wind, the impeller and the first magnetic member can be easily rotated in the space which has been defined between the first and second magnetic members. Thus, the impeller can obtain a sufficient propulsive force. Hence, the generating unit can easily start using the propulsive force of the impeller. As a result, despite the blowing of a light wind, the initial operation of the wind power generator can be smoothly achieved.

In addition, in the present invention, because the rotating force of the impeller is transmitted to the rotor shaft of the generating unit by magnetic repulsive force between the two magnetic members that face each other, the rotating shaft of the impeller is rotated separately from the rotor shaft of the generating unit in free space (that is, under no-load conditions), when the impeller does rotate. Therefore, the impeller can smoothly rotate even when a weak wind is blowing, and thus the wind power generator can easily start.

Third, regardless of whether the rotating shaft and the rotor shaft for power transmission between the impeller and the generating unit are aligned with each other, the rotating force of the impeller can be transmitted to the generating unit by the magnetic repulsive force between the magnetic members. Therefore, the reliability of the operation of the wind power generator can be enhanced.

Furthermore, the magnetic members that generate magnetic repulsive force are installed in respective magnet housings, and extensions protrude from facing ends of the respective magnet housings. Thus, because of the extensions, the first and second magnetic members are prevented from being brought into direct contact with each other, thereby preventing the magnetic repulsive force therebetween from being reduced. Therefore, the efficiency of transmitting the rotating force of the impeller to the generating unit is prevented from deteriorating. As a result, the reliability of the operation of the wind power generator can be ensured. As well, the housings having the extensions prevent impact force from being applied to the first and second magnetic members because of momentary collision therebetween, thus preventing the magnetic members from becoming damaged.

Meanwhile, a power transmission apparatus for wind power generation using magnetic levitation force and a wind power generator using the same according to a second embodiment of the present invention has the following effects.

First, power is transmitted from an impeller to a generating unit using a drive winding spring and a driven winding spring in an interlocking manner without the use of a gear mechanism. Compared to the gear engagement type power transmission method, an initial driving force required for initially rotating the impeller can be reduced. Thus, despite the blowing of a light wind, the impeller can smoothly rotate and an LED can be easily turned on.

The power transmission apparatus transmits the rotating force of a rotating shaft of the impeller that is rotated by wind power to a rotor shaft of the generating unit, and includes the drive winding spring and the driven winding spring which are interlocked and rotate together. Therefore, an angular space of about 350°, within which the rotating shaft and the rotor shaft can rotate with respect to each other, is ensured therebetween. Thus, the impeller can be easily rotated even by a weak wind and turn on the LED.

In addition, in the present invention, the rotating force of the impeller is transmitted to the generating unit using the winding springs, so that the rotating shaft of the impeller is rotated separately from the rotor shaft of the generating unit in free space (that is, under no-load conditions), when the impeller does rotate. Therefore, the impeller can smoothly rotate even when wind is lightly blowing. This is one of the critical characteristics of the present invention.

Second, even if an offset phenomenon, in which power transmission axes between the impeller and the generating unit have become misaligned, occurs, the elasticity of the drive winding spring and the driven winding spring compensate for the offset. Therefore, the rotating force of the impeller can be reliably transmitted to the generating unit, thus further enhancing the reliability of the operation of the wind power generator.

Third, in the present invention, because the drive winding spring and the driven winding spring themselves are of a predetermined elasticity, momentary impact attributable to a backlash event is prevented from affecting the critical parts. Therefore, the durability of the wind power generator is much higher than that of the conventional technique.

Fourth, in the second embodiment in which a drive catch part of the drive winding spring and a driven catch part of the driven winding spring are interlocked and rotate in conjunction with each other to transmit the rotating force of the impeller to the generating unit, a hook is formed by bending the end of the drive catch part of the drive winding spring in a direction crossing the drive catch part, and a hook is formed by bending the end of an axial driven catch part constituting the driven catch part of the driven winding spring in a direction crossing the axial driven catch part. Thus, when the rotor operates, the hook of the drive winding spring and the hook of the driven winding spring are hooked to each other, so that the interlocked state between the drive winding spring and the driven winding spring can be maintained more reliably.

Fifth, a fitting groove is formed in the circumferential outer surface of each of the rotating shaft of the impeller and the rotor shaft of the generating unit. Thus, when the drive winding spring and the driven winding spring are respectively coupled to the rotating shaft of the impeller and the rotor shaft of the generating unit, a coil part of the drive winding spring and a coil part of the driven winding spring are fitted into the corresponding fitting grooves. Therefore, the drive winding spring and the driven winding spring are reliably prevented from becoming displaced from their correct positions.

Sixth, unlike the conventional technique in which lubricating oil must be periodically supplied into a gear box, the second embodiment of the present invention is constructed such that the rotating force of the impeller is transmitted to the generating unit by the interlocking structure between the drive winding spring and the driven winding spring and because of this does not require the supply of lubricant oil. Therefore, maintenance of the wind power generator is easy.

Moreover, the second embodiment of the present invention can also reduce vibration or noise, compared to the conventional technique of using a gear mechanism. In addition, the number of coupling members, such as screws, is reduced. Therefore, occurrence of various problems attributable to loosening of the coupling members can be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power transmission apparatus for a wind power generator, the wind power generator including a generating unit and an impeller rotatably provided ahead of the generating unit so that the generating unit is operated by rotation of the impeller, the power transmission apparatus comprising:
   a first magnetic member provided around a rotating shaft of the impeller; and
   a second magnetic member provided around a rotor shaft of the generating unit, the second magnetic member disposed at a position facing the first magnetic member such that like poles of the first and second magnetic members face each other, so that when the impeller rotates, the rotor shaft of the generating unit is rotated by magnetic repulsive force between the first magnetic member and the second magnetic member.

2. The power transmission apparatus as set forth in claim 1, wherein a first spring is provided around the rotating shaft of the impeller, the first spring including a first coil part fitted over the rotating shaft of the impeller, and a first holding part extending from one end of the first coil part, and a second spring is provided around the rotor shaft of the generating unit, the second spring including a second coil part fitted over the rotor shaft of the generating unit, and a second holding part extending from one end of the second coil part, wherein the first magnetic member is held by the first holding part of the first spring, and the second magnetic member is held by the second holding part of the second spring, such that the first magnetic member and the second magnetic member face each other and are disposed on a single path of rotation.

3. The power transmission apparatus as set forth in claim 2, wherein each of the first holding part of the first spring and the second holding part of the second spring has a hook shape, and the first magnetic member and the second magnetic member are respectively installed in housings, each of the housings being open on one end thereof, wherein the hook-shaped holding part of the first spring and the hook-shaped holding part of the second spring are respectively fitted over circumferential outer surfaces of the housings, so that the first magnetic member and the second magnetic member face each other on the single path of rotation.

4. A wind power generator, comprising:
   a casing;
   an impeller mounted to a front end of the casing so as to be rotatable;
   a generating unit installed in the casing;
   a first magnetic member provided on a circumferential outer surface of a rotating shaft of the impeller; and
   a second magnetic member provided on a circumferential outer surface of a rotor shaft of the generating unit, the second magnetic member disposed at a position facing the first magnetic member such that like poles of the first and second magnetic members face each other, so that when the impeller rotates, the rotor shaft of the generating unit is rotated by magnetic repulsive force between the first magnetic member and the second magnetic member.

5. A wind power generator, comprising:
   a casing;
   an impeller mounted to a front end of the casing so as to be rotatable;
   a generating unit installed in the casing;
   a first magnetic member provided on a circumferential outer surface of a rotating shaft of the impeller;
   a second magnetic member provided on a circumferential outer surface of a rotor shaft of the generating unit, the second magnetic member disposed at a position facing the first magnetic member such that like poles of the first and second magnetic members face each other, so that when the impeller rotates, the rotor shaft of the generating unit is rotated by magnetic repulsive force between the first magnetic member and the second magnetic member;
   a first connection piece and a second connection piece mounted to a circuit board that is electrically connected to the generating unit;
   a connector coupled to a lower end of the casing so as to be rotatable;
   a first terminal and a second terminal provided in the connector, the first terminal and the second terminal being respectively in contact with the first and second connection pieces; and
   a power-based electrical device mounted to a post coupled to the connector, the power-based electrical device being electrically connected to the first terminal and the second terminal.

* * * * *